(12) United States Patent
Hirayama et al.

(10) Patent No.: US 6,460,793 B1
(45) Date of Patent: Oct. 8, 2002

(54) DUAL-BEARING REEL UNIT

(75) Inventors: Hirokazu Hirayama, Sakai (JP); Jun Sato, Sakai (JP)

(73) Assignee: Shimano, Inc., Sakai (JP)

( * ) Notice: Subject to any disclaimer, the term of this patent is extended or adjusted under 35 U.S.C. 154(b) by 74 days.

(21) Appl. No.: 09/676,679

(22) Filed: Oct. 2, 2000

(51) Int. Cl.[7] .......................................... A01K 89/015
(52) U.S. Cl. .................... 242/313; 242/319; 242/321
(58) Field of Search ................................. 242/310, 312, 242/313, 314, 315, 317, 318, 319, 321

(56) References Cited

U.S. PATENT DOCUMENTS

| | | | | |
|---|---|---|---|---|
| 5,370,331 A | * | 12/1994 | Sato | 242/314 |
| 5,558,290 A | * | 9/1996 | Sato | 242/313 |
| 5,577,680 A | * | 11/1996 | Ikuta | 242/313 |
| 5,743,479 A | * | 4/1998 | Miyazaki et al. | 242/310 |
| 5,873,535 A | * | 2/1999 | Jeung | 242/314 |
| 6,293,484 B1 | * | 9/2001 | Oh | 242/310 |

* cited by examiner

Primary Examiner—Emmanuel Marcelo
(74) Attorney, Agent, or Firm—Shinjyu Global IP Counselors, LLP

(57) ABSTRACT

To avoid an odd sensation when gripping a dual-bearing fishing reel unit and to prevent attaching/detaching by mistake, a dual-bearing reel body having: a spool-cranking handle disposed on one side surface and a spool disposed inside, and including a frame; a spool support member; a nub; a first side-cover; and a second side-cover. The reel frame includes a pair of proximal and distal side-plates and arranged at a predetermined spacing, and a circular opening a through which the spool can be passed is provided on the distal side-plate. The spool support member rotatively supports one end of a spool shaft and is detachably mounted to distal side-plate, such that detaching the spool support member reveals the first opening. The nub is for attaching/detaching the spool support member and is provided on the spool support member. The first side-cover can be opened and closed and covers the outer side of the side-plate, together with the spool support member and the nub.

35 Claims, 20 Drawing Sheets

DUAL-BEARING REEL UNIT

BACKGROUND OF THE INVENTION

1. Technical Field

The present invention relates to dual-bearing fishing reel units; more particularly, to dual-bearing reel units to which the spool-cranking handle is disposed unilaterally, and the spool is disposed internally.

2. Description of Related Art

Dual-bearing reels include a reel unit that may be mounted on a fishing rod, a spool disposed inside the reel unit, a spool-cranking handle provided on one side of the reel unit, and a rotation transmission mechanism for transmitting rotation of the handle to the spool. The body of the reel unit includes a reel frame and first and second side-covers. The reel frame includes a pair of first (distal or left) and second (proximal or right) side-plates and connection members connecting the two side-plates, which are covered by the side-covers.

Conventionally known among dual-bearing reel units of this class are those in which a circular opening through which the spool can be passed is formed in the first side-plate, opposite the side where the reel unit crank (handle) is mounted. This enables the spool to be attached/detached from the side opposite the side where the crank is mounted. The first side-cover of conventional dual-bearing reel unit bodies is detachably fitted to the first side-plate, for spool attachment/detachment. A spool support member for rotatively supporting the spool shaft is detachably fitted into the circular opening. The spool support member is coupled to the first side-cover, so that it can be attached/detached unitarily with the side-cover. The configuration is thus such that attaching/detaching the spool support member or the side-cover to/from the side-plate attaches/detaches the side-cover and the spool support member unitarily from/to the side-plate. A removal handle for attaching/detaching the spool support member is accessibly provided exposed from the first or the second side-cover, where it can be operated from the exterior.

Accordingly, the spool support member and the side-cover coming off unitarily enables the spool to be installed or removed by passing it through the opening. In instances in which a centrifugal or like spool-braking mechanism is fitted inside, adjustment of the braking force of the braking mechanism can then be carried out.

Wherein a removal handle is provided accessibly on the first side-cover it is configured with, for example, a foldable handling member and an interlocking member that turns in cooperation with the handling member. The interlocking member interlocks with the periphery of an opening through which the spool is passed, and which is formed in the distal (first) side-plate.

An attach/detach element that is provided accessibly on the second side-cover (that is, on the side where the handle is mounted) includes for example of a plurality of screws that pierce the two side-plates and whose heads are accessible on the second (proximal) side-cover.

Furthermore, for this kind of dual-bearing reel, round dual-bearing reels are known whose side-plates and side-covers are made of metal and are substantially circular when viewed from the side. In these round dual-bearing reels made of metal, the rotation transmission mechanism for transmitting the rotation of the handle to the spool and the clutch mechanism for coupling and de-coupling the handle and the spool are disposed between the side-cover and the side-plate on the side where the handle is mounted. A braking mechanism using centrifugal or magnetic forces to brake the rotation of the spool in the direction unwinding the line is disposed between the side-cover and the side-plate on the distal side. The spool can be detached from the side-plate on the distal side. An opening through which the spool can be passed is formed in the side-plate, and the side-cover is detachable from the side-plate.

To enhance the appearance of this round dual-bearing reel made of metal and to make it lighter, its outer peripheral surface is subjected to a cutting process and through-holes are formed piercing the side-covers.

In this conventional configuration, if the handle part is provided exposed to be accessible on the first side-cover, then the handle part tends to stick out, so that the handle part contacts the palm of the hand when by a "palming" operation the reel unit and the fishing rod are gripped together. When the handle part touches the palm of the hand, it may cause an odd sensation in the palm of the hand. Also, depending on the structure of the removal handle, the removal handle may be actuated by mistake.

Furthermore, providing the removal handle on the first side-cover—especially in the case of round metal reels that are circular when seen from the side—makes it difficult, not being able to attain a sleek impression design-wise, to attain an appearance having a classic sense.

If the removal handle in these conventional configurations is provided accessibly from the outside on the second side-cover, then a plurality of screws have to be taken off, which complicates the attach/detach operation considerably.

Additionally, when through-holes are formed in the side-covers of the reel unit in this conventional round dual-bearing reel, water, or dirt such as sand or dust, easily enters the reel through the through-holes. When water or dirt enters the inside of the reel, it adheres to the various mechanisms disposed behind the side-cover and may harm the ability of the spool to rotate or to brake. Especially in a dual-bearing reel provided with an opening for detaching the spool in the distal side-cover (on the side that is opposite to where the crank is mounted), there is the danger that water or dirt can enter through this opening to the side of the spool.

SUMMARY OF THE INVENTION

It is an object of the present invention to avoid an odd sensation when gripping the reel unit and to prevent attaching/detaching by mistake.

It is a further object of the present invention to attain a classic appearance.

It is a furthermore object of the present invention to allow easy opening and closing of the first side-cover, and to allow an opening and closing of the first side-cover in which the operating element does not contact the palm of the hand when gripping the reel unit.

It is a still further object of the present invention to suppress the intrusion of water or dirt into the reel even though through-holes are formed in the side-cover to enhance the reel's appearance and to make it lighter.

According to a first aspect of the present invention, the body of a dual-bearing reel unit has a shaft-cranking handle disposed on one side surface of the dual-bearing reel body and a spool disposed inside the dual-bearing reel body, and comprises: a frame; a spool support member; an removal handle; a first side-cover; and a second side-cover. The frame includes a pair of side-plates arranged at a predetermined spacing, and a circular first opening through which the spool can be passed is provided on the distal side-plate. The spool support member rotatively supports one end of a rotation shaft of the spool and is detachably mounted to the distal side-plate, such that detaching the spool support member reveals the first opening. The removal handle is for attaching/detaching the spool support member and is provided on the distal side-plate or on the spool support member. The first side-cover can be opened and closed and covers the outer side of the distal side-plate, in which the first opening is formed, together with the spool support member and the removal handle. The second side-cover covers the outer side of the proximal side-plate and supports shaft-cranking handle rotation.

In a dual-bearing reel body thus, the first side-cover is removed from the distal side-plate to attach or detach the spool, and the spool support member is removed from the distal side-plate by operating the removal handle, which is mounted inside. This reveals the first opening and the spool can be removed. If for example a centrifugal braking mechanism for braking the spool is provided on the side of the spool, then it is possible to adjust the braking force of the centrifugal braking mechanism after the spool support member has been removed. Together with the spool support member, the removal handle is covered by the first side-cover, so that the removal handle will not be operated by mistake when gripping the reel unit in a palming motion or the like, nor is an odd sensation caused by touching the removal handle. Furthermore, the removal handle is hidden behind the first side-cover and not directly visible from the outside, which increases the degree of design freedom for the first side-cover and makes it easier to attain a classic appearance.

According to a second aspect of the present invention, in a dual-bearing reel body as in the first aspect, the perimeter of the two side-covers and side-plates is circular or substantially circular when viewed in a direction of the rotation axis. In this case, the removal handle can be hidden from the reel body of a round dual-bearing reel unit, so that it is easier to attain a classic appearance.

According to a third aspect of the present invention, in a dual-bearing reel body as in the second aspect, the two side-covers and the frame are made of metal. In this case the outer appearance is dominated by the texture of the metal, which enhances the reel's classic appearance.

According to a fourth aspect of the present invention, in a dual-bearing reel body as in any of the first to third aspects, the first opening is provided with a female interlocking portion, and the spool support member is provided with a male interlocking portion for coupling/de-coupling with the female interlocking portion by rotation. In this case, when the spool support member is turned in one direction, and the spool support member is mounted in the opening portion on the distal side-plate by engaging the two interlocking portions. Furthermore, when it is turned in the other direction, the spool support member is detached and can be removed from the side-plate. Here, the spool support member can be easily attached or detached by a turning operation.

According to a fifth aspect of the present invention, in a dual-bearing reel body as in the fourth aspect, the female interlocking portion is internal threads, and the male interlocking portion is external threads. In this case, the attach/detach structure of the spool support member can be realized easily by forming internal and external threads.

According to a sixth aspect of the present invention, in a dual-bearing reel body as in the fourth or fifth aspect, the removal handle comprises a nub for a turning operation, provided in the outer surface of the spool support member. In this case, the spool support member can be turned simply by grasping the protruding nub.

According to a seventh aspect of the present invention, in a dual-bearing reel body as in the sixth aspect, the spool support member is provided with a second opening between the nub and the male interlocking portion, through which the side of the spool can be accessed. In this case, the side of the spool can be accessed through the second opening, so that for example, if a centrifugal braking mechanism is provided on the side of the spool, the braking force of the centrifugal braking mechanism can be adjusted easily without removing the spool support member. Moreover, since the spool support member is still mounted to the side-plate, the spool does not fall out when adjusting the braking force.

According to an eighth aspect of the present invention, in a dual-bearing reel body as in the sixth or the seventh aspect, an internal face of the first side-cover that is in opposition to the distal side-plate is provided with a protrusion, against which the nub abuts when the spool support member has not been screwed in properly. In this case, when the convex side-cover has not been screwed in properly and is not in its proper orientation, the protrusion provided in the side-cover abuts against the nub, and the side-cover cannot be mounted in the side-plate. Therefore, proper mounting of the spool support member to the side-plate can be ensured.

According to a ninth aspect of the present invention, in a dual-bearing reel body as in the first to eighth aspects, the first side-cover is mounted on the distal side-plate, such that the first side-cover is axially movable and pivotal around a first axis that is parallel to the rotation axis of the spool. In this case, the first side-cover is pivotal around an axis that is parallel to the rotation axis of the spool, so that it needs almost no space in the rotation axis direction when being attached or detached, and it can be attached or detached in a compact fashion.

According to a tenth aspect of the present invention, a dual-bearing reel body as in the ninth aspect further includes a first urging member urging the first side-cover in a direction away from the distal side-plate. In this case, when the first side-cover has been removed from the side-plate, the first side-cover is separate from the side-plate, so that the first side-cover pivots automatically under its own weight and reveals the spool support member.

According to a eleventh aspect of the present invention, in a dual-bearing reel body as in the ninth or tenth aspects, the spool support member is mounted in the distal side-plate on the inner side of the first side-cover, pivotal around the first axis and axially movable. In this case, the spool support member, too, pivots like the first side-cover, so that also the spool support member needs almost no space in the rotation axis direction when being attached or detached, and the first side-cover can be attached or detached in a compact fashion. Also, sharing the pivot axis with the first side-cover makes the pivot structure simple.

According to a twelfth aspect of the present invention, a dual-bearing reel body as in the eleventh aspect further includes a second urging member urging the spool support member away from the distal side-plate. In this case, when the side-plate and the spool support member have been disengaged, the spool support member is separate from the side-plate, so that the spool support member pivots automatically under its own weight and makes the side of the spool accessible through the first opening.

According to a thirteenth aspect of the present invention, in a dual-bearing reel body as in the ninth to eleventh aspect, the first side-cover is fastened to the distal end of a pivot shaft disposed on the distal side-plate along the first axis, the pivot shaft being pivotal and movable in the axial direction. In this case, since the first side-cover is fixed to the distal end of the pivot shaft, the first side-cover can be fastened easily to the side-cover by positioning the pivot shaft in a certain orientation.

According to a fourteenth aspect of the present invention, a dual-bearing reel body as in the thirteenth aspect further includes a threaded member screwed to the proximal end of the pivot shaft, the threaded member being mounted rotatively and non-detachably in the second side-cover. In this case, the first side-cover can be pulled towards the handle and fastened by screwing the threaded member provided at the second side-cover to the pivot shaft.

According to a fifteenth aspect of the present invention, a dual-bearing reel body as in the thirteenth aspect further includes a locking member for locking the proximal end of the pivot shaft, the locking member being mounted in the second side-cover and shiftable in the radial direction of the pivot shaft. In this case, the pivot shaft can be locked simply by shifting the locking member in the radial direction, which makes it easy to attach or detach the first side-cover.

According to a sixteenth aspect of the present invention, in a dual-bearing reel body as in any of the first to eighth aspects, the first side-cover is mounted pivotally around an axis that is parallel to a second axis intersecting the rotation axis of the spool. In this case, the first side-cover pivots around an axis that is parallel to a second axis intersecting the rotation axis of the spool, which enlarges the space in the direction of the rotation axis, but does not enlarge the space in the direction of the second axis.

According to a seventeenth aspect of the present invention, a dual-bearing reel body as in any of the ninth to sixteenth aspect further includes a means for retaining the first side-cover open when it has been opened by pivoting. In that case, the first side-cover is retained in its open position, which makes it easier to exchange the spool or to adjust the centrifugal braking mechanism.

According to an eighteenth aspect of the present invention, a dual-bearing reel unit to be mounted on a fishing rod has a handle disposed on one side surface of the dual-bearing reel unit body and a spool disposed inside the dual-bearing reel body, and includes a frame, a pair of side-covers, a fishing rod mounting portion, and an open/close mechanism. The frame includes a pair of side-plates between which the spool is disposed and a connection member for connecting the side-plates. The two side-covers cover the outer sides of the two side-plates. The handle is mounted on the proximal one of the two side-covers, and the distal side-cover is mounted on the distal side-plate and can be opened and closed. The fishing rod mounting portion for mounting on the fishing rod is disposed between the pair of side-plates. The open/close mechanism is for opening and closing the distal side-cover and includes an handle part that is accessible on the proximal side-cover.

In a dual-bearing reel body thus, the distal side-cover can be opened and closed, simply by operating the handle part provided accessibly on the proximal side-cover (that is, on the side where the handle is mounted). This makes the opening and closing very easy. Moreover, since the handle part is provided on the side-cover where the handle is mounted, and which is not as easily touched by the palm when gripping the reel unit in a palming motion, the palm does not touch the handle part when gripping the wheel, even if the handle part sticks out.

According to a nineteenth aspect of the present invention, in a dual-bearing reel body as in the eighteenth aspect, a perimeter of at least one of the two side-covers and the two side-plates is circular or substantially circular when viewed in a direction of the rotation shaft. In this case, there is no handle part provided on the distal side-cover of the reel body of a round dual-bearing reel unit, so that a classic appearance of the distal side-cover can be attained.

According to a twentieth aspect of the present invention, in a dual-bearing reel body as in the nineteenth aspect, the two side-covers and the frame are made of metal. In this case the outer appearance is dominated by the texture of the metal, which enhances the reel's classic appearance.

According to a twenty-first aspect of the present invention, in a dual-bearing reel body as in any of the eighteenth to twentieth aspects, the distal side-cover is mounted to the distal side-plate, the distal side-cover is pivotal around a first axis that is parallel to a rotation axis of the spool, and the distal side-cover is movable in axial direction. In this case, the distal side-cover is pivotal around an axis that is parallel to a rotation axis of the spool, so that only little space in the direction of the rotation axis is necessary for attaching and detaching, and the distal side-cover can be attached and detached in a compact fashion.

According to a twenty-second aspect of the present invention, a dual-bearing reel body as in the twenty-first aspect further comprises a first urging member urging the distal side-cover away from the distal side-plate. In this case, when the distal side-cover has been removed from the distal side-plate, the distal side-cover is separate from the distal side-plate, so that the distal side-cover pivots automatically under its own weight.

According to a twenty-third aspect of the present invention, in a dual-bearing reel body as in the twenty-first or the twenty-second aspects, the distal side-cover is fixed to a distal end of a pivot shaft disposed on the distal side-plate, the pivot shaft being disposed along the first axis, pivotally and movably in axial direction. In this case, the distal side-cover is fixed to the distal end of the pivot shaft, so that the distal side-cover can be fastened easily to the distal side-cover by positioning the pivot shaft in a certain shaft orientation and fastening the distal side-cover.

According to a twenty-fourth aspect of the present invention, in a dual-bearing reel body as in the twenty-third aspect, the handle part is a threaded member, which is provided rotatively and non-detachably in the proximal side-cover and is screwed onto the proximal end of the pivot shaft. In this case, the distal side-cover can be pulled towards the handle and fastened to the distal side-plate by screwing the threaded member provided in the proximal side-cover to the pivot shaft.

According to a twenty-fifth aspect of the present invention, in a dual-bearing reel body as in the twenty-third aspect, the handle part is an interlocking member interlocking with the proximal end of the pivot shaft, the interlocking member being arranged in the proximal side-cover and movable in the radial direction of the pivot shaft. In this case, the interlocking member interlocks with the pivot shaft simply by being moved in the radial direction, so that it is easy to attach or detach the distal side-cover.

According to a twenty-sixth aspect of the present invention, in a dual-bearing reel body as in any of the eighteenth to twentieth aspects, the distal side-cover is mounted pivotally around an axis that is parallel to a second axis intersecting the rotation axis of the spool. In that case, the distal side-cover pivots around an axis that is parallel to a second axis intersecting the rotation axis of the spool, which enlarges the space in the direction of the rotation axis becomes, but does not enlarge the space in the direction of the second axis.

According to a twenty-seventh aspect of the present invention, a dual-bearing reel body as in any of the twenty-first to twenty-sixth aspects further comprises a means for retaining the first side-cover open when it has been opened by pivoting. In that case, the first side-cover is retained in its open position, which makes it easier to exchange the spool.

According to a twenty-eighth aspect of the present invention, a dual-bearing reel unit to be mounted on a fishing rod has a handle disposed on one side surface of the dual-bearing reel unit body and a spool disposed inside the dual-bearing reel body, and includes a frame, a pair of side-covers, a sealing member, and a fishing rod mounting portion. The frame includes a pair of side-plates between which the spool is disposed and a connection member for connecting the side-plates. The pair of side-covers cover the outer side of the two side-plates, and a plurality of through-holes pierce at least one of the pair of side-covers. The sealing member is disposed on an inner surface of said at least one of the pair of side-covers in which the through-holes are formed and covers the plurality of through-holes. The fishing rod mounting portion is for mounting on the fishing rod and is disposed between the pair of side-plates.

In a dual-bearing reel body thus, a plurality of through-holes is formed in at least one of the two side-covers to enhance the reel's appearance and to make it lighter. On the inner surface of the side-cover in which the through-holes are formed, a sealing member is provided, covering the plurality of through-holes. Thus, the intrusion of water or dirt into the reel is suppressed, even though through-holes are formed in the side-cover to enhance the reel's appearance and to make it lighter.

According to a twenty-ninth aspect of the present invention, in a dual-bearing reel body as in the twenty-eighth aspect, the handle is mounted on the proximal side-cover, and the through-holes are formed only on the distal side-cover, to which the handle is not mounted. In this case, through-holes are formed only in the side-cover opposite from the side where the handle is mounted, that is, the side where fewer mechanisms are disposed than on the handle side. Thus, even in the event of intruding dirt or water, any ensuing damage can be suppressed to a minimum.

According to a thirtieth aspect of the present invention, in a dual-bearing reel body as in the first or the twenty-ninth aspect, the sealing member is attached to substantially the entire inner surface of said at least one of the pair of side-covers in which through-holes are formed. In this case, the sealing member is attached to substantially the entire inner surface of the side-cover(s), which leads to a simple sealing structure, even if a multitude of through-holes are formed.

According to a thirty-first aspect of the present invention, in a dual-bearing reel body as in the thirtieth aspect, the sealing member includes a fastening portion with which it is fastened to the side-cover(s). In this case, the sealing member is fastened to the side-cover(s), so that it can be fastened detachably but firmly to the side-cover(s), for example with a screw.

According to a thirty-second aspect of the present invention, in a dual-bearing reel body as in the thirty-first aspect, a circular opening through which the spool can be passed is formed in the distal side-plate. The dual-bearing reel body further comprises a spool support member rotatively supporting one end of a rotation shaft of the spool. The spool support member is detachable by rotation on the distal side-plate, thereby uncovering the opening. The fastening portion of the sealing member includes a protruding portion, which protrudes towards the spool support member. The protruding portion acts as a spool support member turn-stop. In this case, the rotation of the spool support member, which is detachable and reveals the opening by turning on the side-plate, is inhibited by the fastening portion of the sealing member, so that the spool support member is not liable to become loosened with respect to the side-plate when attaching the side-cover.

According to a thirty-third aspect of the present invention, in a dual-bearing reel body as in the thirty-first or thirty-second aspect, the sealing member further comprises, at a position that is separate from the fastening portion, an interlocking portion interlocking with the distal side-cover. In this case, the sealing portion is fastened with the fastening portion after interlocking with the interlocking portion, so that the sealing portion can be attached firmly to the side-cover by fastening it at just one location.

According to a thirty-fourth aspect of the present invention, in a dual-bearing reel body as in any of the twenty-eighth to thirty-third aspects, the sealing member is made of a synthetic resin. In this case, the shape of the sealing member can be adapted easily to the shape of the inner surface of the side-cover, using a manufacturing method such as injection molding. Furthermore, taking advantage of the elasticity of synthetic resin, gaps between the two can be reduced, and the intrusion of dirt or water can be suppressed even better.

According to a thirty-fifth aspect of the present invention, in a dual-bearing reel body as in the thirty-fourth aspect, the sealing member is translucent. In this case, light passes the through-holes, making it easier to conceal the presence of the sealing member, and keeping the design quality from being degraded despite arranging the sealing member on the side-cover inside.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

First Embodiment

Figure 1:
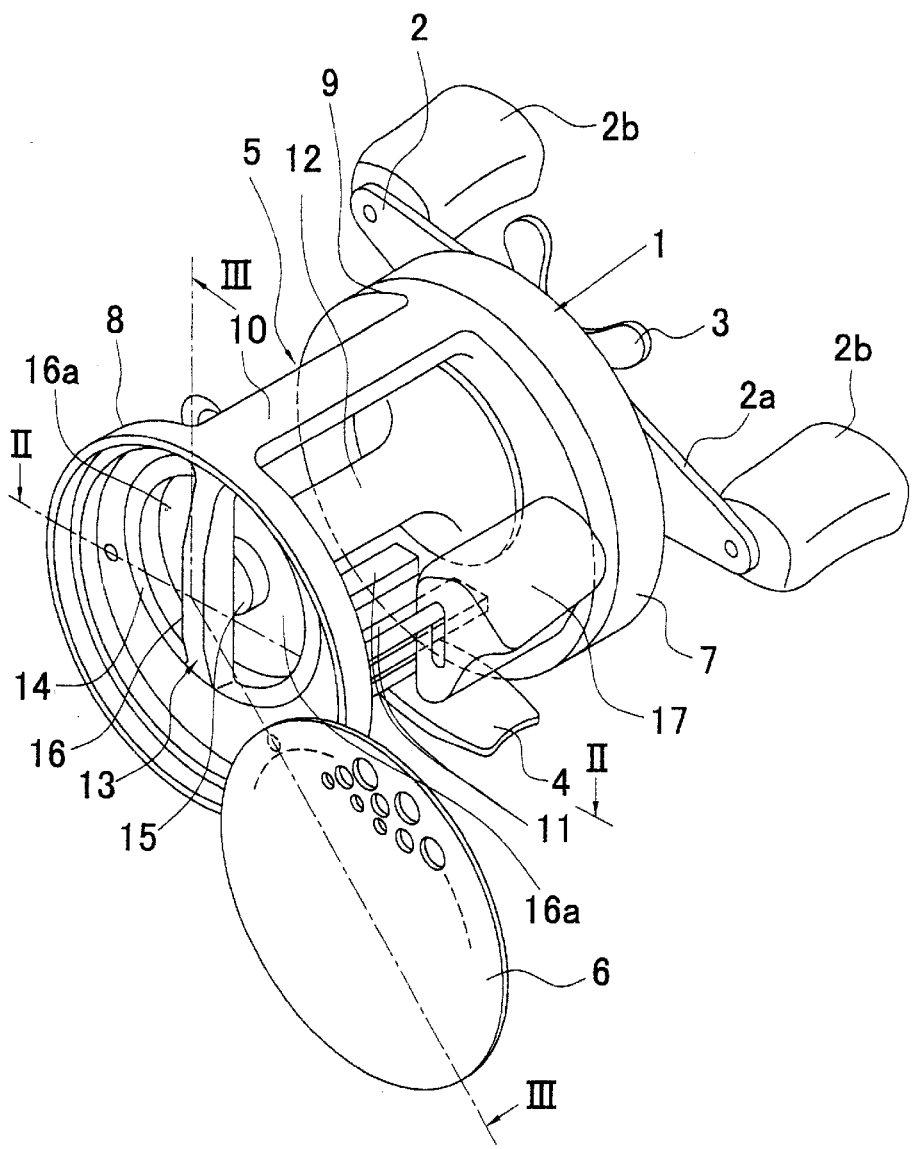
FIG. 1 is an oblique view of a dual-bearing reel in an embodiment of the present invention.
Figure 2:
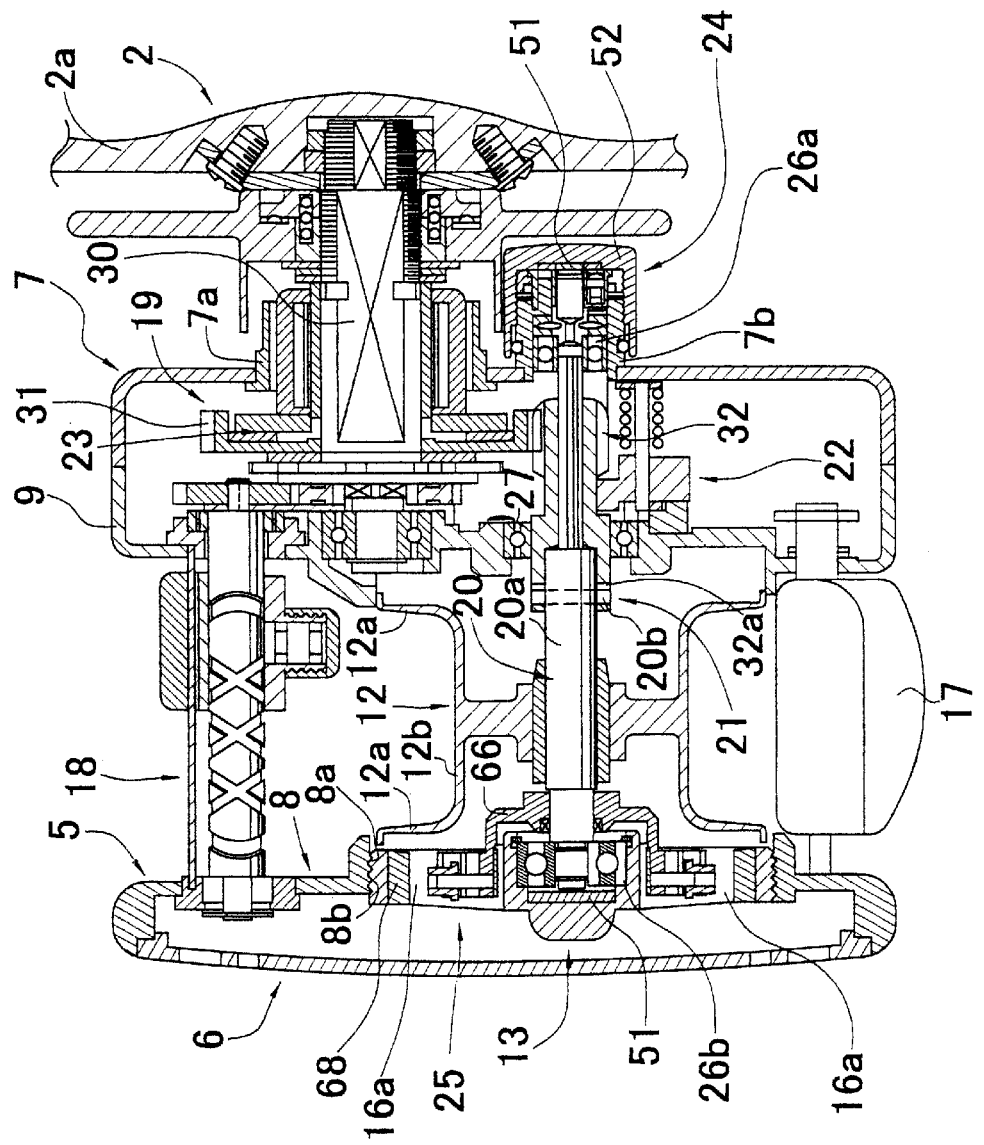
FIG. 2 is a sectional view taken along II—II in FIG. 1, seen in the direction of the arrows.
Figure 3:
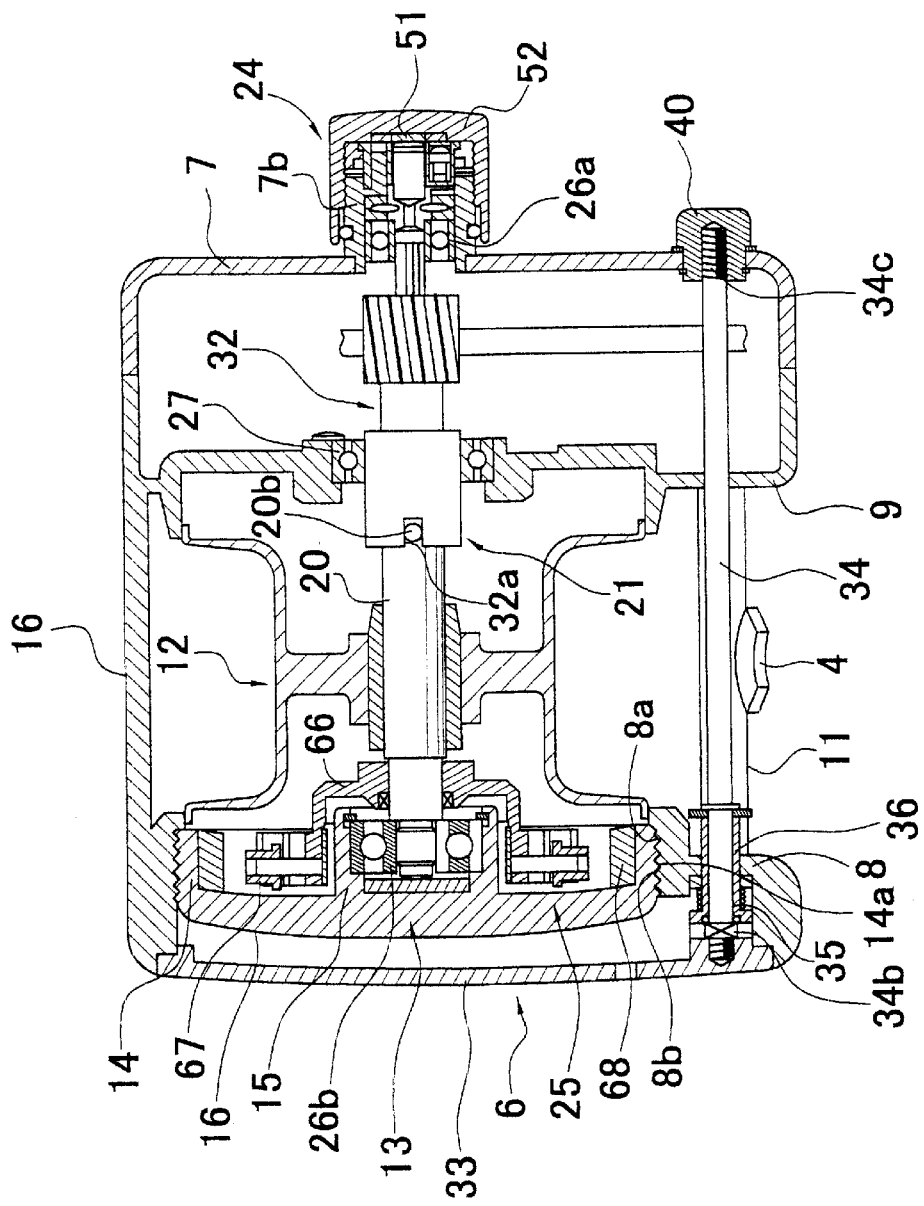
FIG. 3 is a sectional view taken along III—III in FIG. 1, seen in the direction of the arrows.

The dual-bearing reel shown in FIGS. 1 to 3, which is an embodiment of the present invention, is a round dual-bearing reel for bait-casting. This reel is provided with a reel body 1, a handle 2 for turning a spool, and a star drag 3 for adjusting drag. The handle 2 is disposed on one side of the reel body 1. The star drag 3 is disposed on the same side of the reel body 1 as the handle 2. The handle 2 is of the double-handle type and has a plate-shaped arm portion 2a and grips 2b that are rotatively attached to both ends of the arm portion 2a.

The reel body 1 is made of metal, such as an aluminum alloy or a magnesium alloy for example, and includes a frame 5, and a first side-cover 6 and a second side-cover 7 attached to the two sides of the frame 5. A spool 12 for winding fishing line is provided rotatively and detachably on a spool shaft 20 (see FIG. 2) inside the reel body 1. When viewed in spool shaft direction, the first side-cover 6 and the second side-cover 7 are circular or substantially circular.

As shown in FIG. 2, the spool 12, a clutch lever 17, and a level-wind mechanism 18 are disposed inside the frame 5. The clutch lever 17 functions as a thumb rest when pitching. The level-wind mechanism 18 is for uniformly winding fishing line around the spool 12. A gear mechanism 19, a clutch mechanism 21, an engage/disengage control mechanism 22, a drag mechanism 23, and a casting control mechanism 24 are disposed in the space between the frame 5 and the second side-cover 7. The gear mechanism 19 transmits rotational force from the handle 2 to the spool 12 and the level-wind mechanism 18. The engage/disengage control mechanism 22 controls the engaging and disengaging of the clutch mechanism 21 in response to the operation of the clutch lever 17. The drag mechanism 23 dampens the spool 12. The casting control mechanism 24 adjusts the resistance that develops when the spool 12 rotates. Also, a centrifugal braking mechanism 25 for preventing backlash when casting is disposed between the frame 5 and the first side-cover 6.

As shown in FIGS. 1 to 3, the frame 5 includes a first and a second side-plates 8 and 9 disposed in opposition to each other at a predetermined spacing, and upper and lower connecting portions 10 and 11 connecting the side-plates 8 and 9 into one unit. Also the two side-plates 8 and 9 are circular or substantially circular when viewed in the spool shaft direction and are flat cylindrical elements accommodating a space inside. A circular opening 8a for attaching and detaching the spool 12 is formed slightly above the center of the first side-plate 8 (on the side that is opposite to where the handle 2 is mounted). An internally threaded portion 8b is formed on the inner peripheral surface of the opening 8a. A cylindrical boss 7a for supporting the handle shaft 30 and a cylindrical boss 7b for supporting the spool shaft 20 are fixed tightly to the second side-plate 9, spaced apart at a certain distance and protruding outward. The upper connecting portion 10 is arranged in the same plane as the perimeter of the side-plates 8 and 9, whereas a pair of front and rear lower connecting portions 11 are formed inwardly from the perimeter. An oblong rod-mounting leg 4 made of metal, such as stainless steel for example, for mounting the reel to a fishing-rod is riveted to the lower connecting portions 11.

A spool support member 13, which rotatively supports one end of the spool shaft 20, is provided detachably at the opening 8a of the first side-plate 8. As shown in the FIGS. 1 to 3 and 5, the spool support member 13 includes a ring portion 14, a cylindrical bearing portion 15 having a bottom, and a nub 16. The ring portion 14 is installed detachably in the opening 8a. The bearing portion 15 is arranged concentrically to the ring portion 14 to the inner side of the ring portion 14. The nub 16 connects the ring portion 14 with the bearing portion 15 and is for turning the spool support member 13. These portions are formed in one piece of plastic or metal.

On the outer peripheral surface of the ring portion 14, an externally threaded portion 14a is formed, which can be screwed into the internally threaded portion 8b formed in the opening 8a. A brake liner 68 of a centrifugal braking mechanism 25 is fixed to the inner peripheral surface of the ring portion 14.

A bearing 26b for rotatively supporting one end of the spool shaft 20 is provided at the inner peripheral surface of the bearing portion 15. A friction plate 51 of the casting control mechanism 24 is mounted on its bottom.

Curved convexly outward axially, the nub 16 connects the ring portion 14 with the bearing portion 15 and is disposed along a diameter direction of these. As a result, openings 16a are formed on both sides of the nub 16. It is possible to see the side of the spool 12 and to introduce one's fingertips through these openings 16a.

Figure 4:
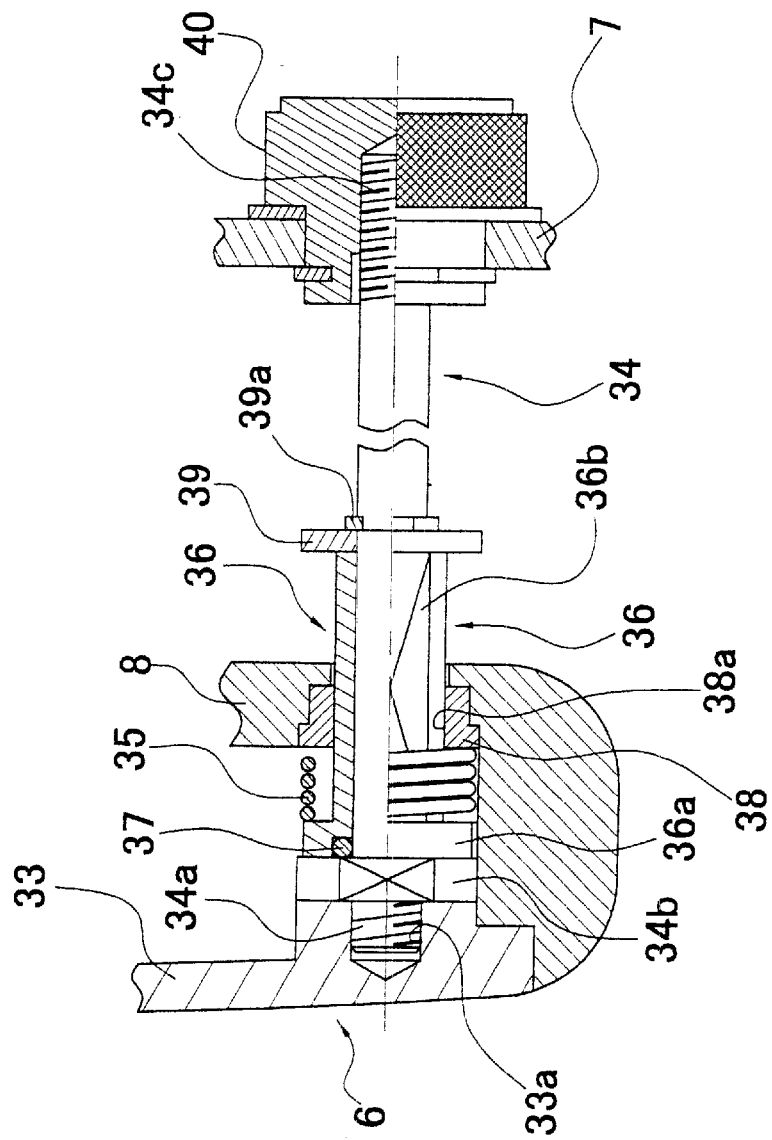
FIG. 4 is a fragmentary section view of FIG. 3.
Figure 5:
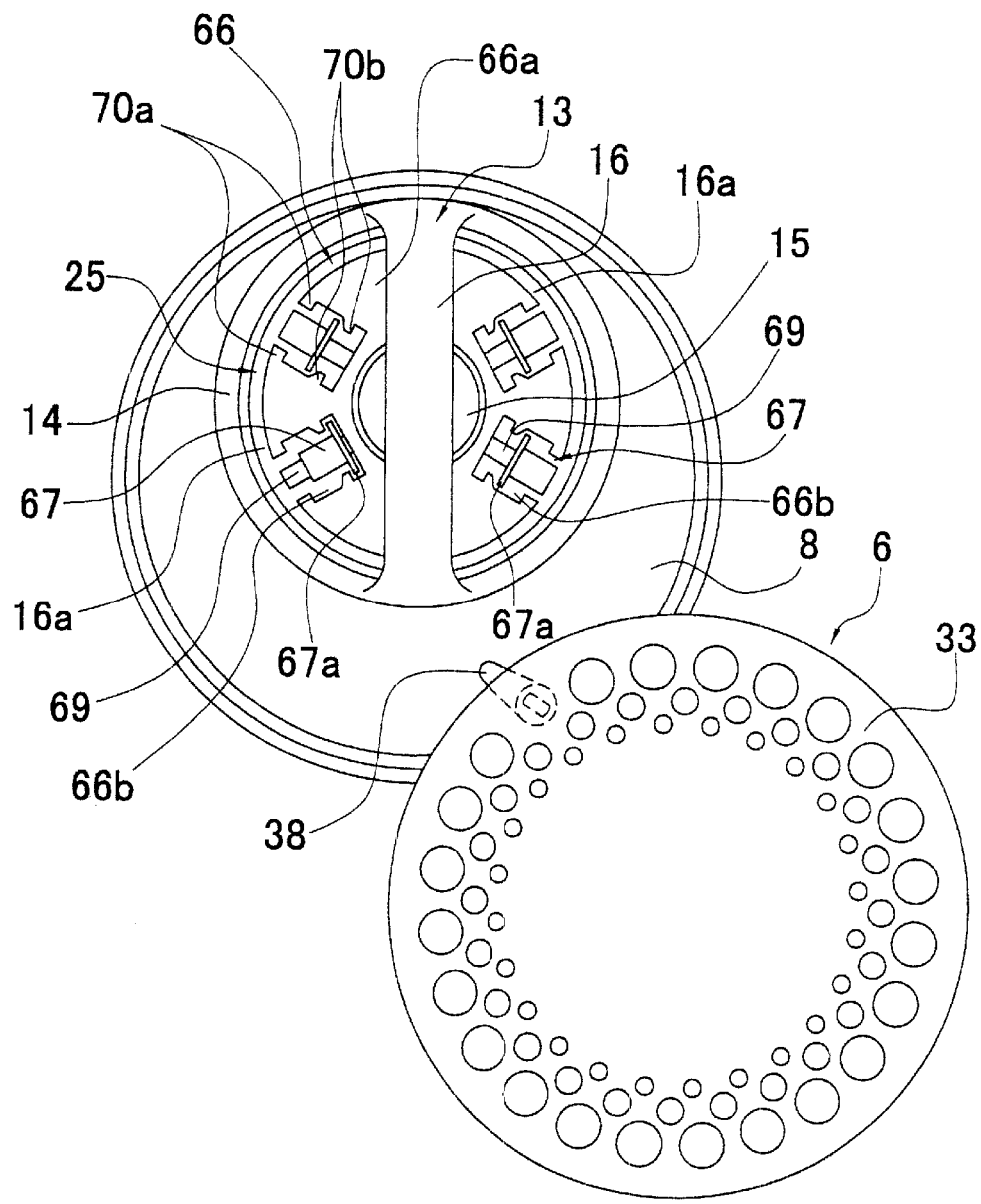
FIG. 5 lateral view of the open disposition, taken from the right.

As shown in FIGS. 3 to 5, the first side-cover 6 can be opened or closed on the frame 5, and is mounted pivotally to the first side-plate 8 to make it possible to attach and detach the spool 12. The first side-cover 6 can be pivoted from the closed position shown in FIGS. 2 and 3 to the open position shown in FIGS. 1 and 5. The first side-cover 6 includes a disk-shaped cover 33 covering the outer side of the first side-plate 8, a pivot shaft 34 for pivotally supporting the cover 33, and a coil spring 35 urging the cover 33 away from the first side-plate 8. The cover 33 is made of a piece of metal that is slightly curved convexly to the outside so as to cover the first side-plate 8. In order to enhance its appearance, its peripheral portion is provided with multiple round holes, spaced apart in the circumferential direction. On the inner surface near the periphery of the cover 33, a threaded hole 33a for attaching the pivot shaft 34 is formed.

A threaded portion 34a that is screwed into the threaded hole 33a is formed on the tip of the pivot shaft 34. A tool interlocking portion 34b with a larger diameter is formed adjacent to the threaded portion 34a. The threaded portion 34a is screwed into the cover 33, thereby fastening the pivot shaft 34 to the cover 33.

A pipe member 36 piercing the first side-plate 8 is arranged concentrically around the pivot shaft 34. The tip of the pivot shaft 34 is supported rotatively by the pipe member 36. The base end of the pivot shaft 34 is supported rotatively by the second side-plate 9, and protrudes outward beyond the second cover 7. The pipe member 36 supports the pivot shaft 34 not only rotatively, but also so that the pivot shaft 34 cannot shift axially. A large diameter portion 36a is formed on the tip of the pipe member 36, and an O-ring 37 for restricting the pivoting speed is mounted inside this large diameter potion 36a.

A compressed coil spring 35 is mounted between the large diameter portion 36a and the first side-plate 8. Parallel cut-away portions 36b are formed in the outer peripheral surface of the pipe member 36, except for the portion of the large diameter potion 36a. A support member 38 having an oval hole 38a for supporting the cut-away portions 36b non-rotatively but movably in the axial direction is screwed to the first side-plate 8. A check disk 39 for restricting the axial shifting of the pivot shaft 34 is fastened with a snap ring 39a to the base end of the pipe member 36. By retaining the pipe member 36 between this check disk 39 and the tool interlocking portion 34b, the pivot shaft 34 cannot be shifted axially with respect to the pipe member 36. Also, when the first side-cover 6 is opened, the check disk 39 abuts against the first side-plate 8, thereby determining its axial position. Thus, the first side-cover 6 is mounted, pivotally and movably in the axial direction over a certain distance, to the first side-plate 8, and can be opened and closed without falling off the first side-plate 8.

A threaded portion 34c is formed on the base end of the pivot shaft 34. The threaded portion 34c is screwed into a detachable nut 40. The nut 40 is mounted to the second side-cover 7 rotatively but immovably with respect to the axial direction. When the threaded portion 34c is separated from the nut 40 by turning the nut 40 counterclockwise, the pivot shaft 34 is urged by the coil spring 35 to the left in FIG. 4. Thereby, the cover 33, too, shifts to the left and the first side-cover 6 opens. As the first side-cover 6 opens, it pivots under its own weight. The pivoting speed is adjusted to an appropriate speed with the O-ring 37.

The spool 12 has saucer-shaped flange portions 12a on both ends and a cylindrical spool body 12b between the two flange portions 12a. The spool 12 also has a cylindrical boss 12c, formed in one piece with it at substantially the center with respect to the axial direction on the inner side of the spool body 12b. The spool 12 is fixed non-rotatively, for example by serration coupling, to the spool shaft 20 penetrating the boss 12c. The fixing is not limited to serration coupling, and other coupling methods such as key coupling or spline coupling can be employed as well.

The spool shaft 20 penetrates the side-plates 9 and extends beyond the second side-cover 7. This end of the spool shaft 20 is supported rotatively with a bearing 26a at the boss 7b, which is provided at the second side-cover 7. The other end of the spool shaft 20 is supported rotatively with the bearing 26b as described above.

The right end of the large diameter portion 20a of the spool shaft 20 is disposed at a portion where the second side-plate 9 is pierced, and an engaging pin 20b, which is part of the clutch mechanism 21, is fixed in the spool shaft 20 at this place. The engaging pin 20b pierces the large diameter portion 20a through its diameter and protrudes radially from both sides.

The gear mechanism 19 includes a handle shaft 30, a main gear 31 fixed to the handle shaft 30, and a cylindrical pinion gear 32 meshing with the main gear 31. As shown in FIG. 3, the pinion gear 32 extends from outside of the second side-plate 9 to the inside thereof. The pinion gear 32 is cylindrical and is pierced by the spool shaft 20, on which it is mounted movably in the axial direction. A bearing 27 in the second side-plate 9 supports the left side of the pinion gear 32 in FIG. 3 rotatively and movably in the axial direction. A meshing groove 32a meshing with the engagement pin 20b is formed at the left end of the pinion gear 32 in FIG. 3. The meshing groove 32a and the engagement pin 20b form the clutch mechanism 21.

As shown in FIG. 2, the clutch lever 17 is disposed at the rear end of the pair of side-plates 8 and 9 behind the spool 12. The clutch lever 17 slides vertically.

The casting control mechanism 24 includes a plurality of friction plates 51 and a braking cap 52. The friction plates 51 are disposed on either end of the spool shaft 20. The braking cap 52 is for adjusting the force with which the friction plates 51 are pressed against the spool shaft 20. The left friction plate 51 is provided inside the spool support member 13.

As shown in FIGS. 3 and 5, the centrifugal braking mechanism 25 includes a rotor 66, cylindrical sliders 67, and a brake liner 68. The rotor 66 is fastened to the spool shaft 20 so that it rotates together with the spool 12. The sliders 67 are provided in the rotor 66 at certain intervals in the circumferential direction and are movable in the radial direction. The brake liner 68 is fixed to the inner peripheral surface of the ring portion 14 and can be brought into contact with the sliders 67. The rotor 66 includes a circular plate 66a provided around the bearing portion 15. For example six recesses 66b are formed in the circular plate 66a, spaced apart at intervals in the circumferential direction. In these recesses 66b, two pairs of opposing interlocking protrusions 70a and 70b are formed at a certain distance in the radial direction. The interlocking protrusions 70a are formed projecting towards one another at an outer periphery of the circular plate 66a and prevent the sliders 67 from falling off. The interlocking protrusions 70b formed more to the inside prevent the sliders 67 from contacting the brake liner 68. Furthermore, guide shafts 69 are provided at the bottom surface of the recesses 66b, fanning out radially. Guided by the guide shafts 69, the sliders 67 can shift back and forth thereon.

The sliders 67 are cylindrical and are provided at their inward edge portions with collars 67a interlocking with the interlocking portions 70a and 70b. The diameter of those collars 67a is larger than that of the other portions. When the spool 12 rotates, centrifugal forces act on the sliders 67 and bring the sliders 67 into contact with the brake liner 68, thereby braking the spool 12. If the collars 67a are located inwardly beyond the interlocking projections 70b, then the collars 67a abut the interlocking projections 70b when centrifugal forces are at work, so that the sliders 67 cannot be brought into contact with the brake liner 68. The braking force of the centrifugal braking mechanism 25 can then be adjusted by switching the radial positions of the sliders 67.

The following explains how the spool 12 may be attached and detached.

To remove the spool 12 from the reel body 1, for example when a backlash has caused the fishing line to become entangled with the spool 12, the first cover 6 is opened, revealing the opening 8a in the first side-plate 8.

To open the first side-cover 6, first, the nut 40 is turned counterclockwise, and the pivot shaft 34 is detached from the nut 40. When the pivot shaft 34 has been detached from the nut 40, the spring force of the coil spring 35 urges the pivot shaft 34 to the left in FIG. 4, together with the first side-cover 6. Then, the first side-cover 6 pivots around the pivot shaft 34 by its own weight, and the first side-cover 6 opens. FIGS. 1 and 5 illustrate the situation when the first side-cover is open. Opening the first side-cover 6 reveals the spool support member 13. In this situation, it is possible to insert one's fingers through the opening 16a and switch the position of the sliders 67 of the centrifugal braking mechanism 25 in the radial direction of the spool to adjust the braking force. That is to say, when the sliders 67 are located on the inside of the interlocking projections 70b, they cannot be brought into contact with the brake liner 68, so that the braking force is weakened.

When the first side-cover 6 is open, it is possible to hold the nub 16 with thumb and index finger and turn the spool support member 13 counterclockwise. This detaches the spool support member 13 from the first side-plate 8 and reveals the opening 8a. In this situation, it is possible to take the spool shaft 20 and pull it out to remove the spool 12.

When the spool 12 has been inserted back in after having been removed, the first side-cover 6 is closed. To do so, the cover 33 is swung by hand into its closed orientation and then pressed toward the first side-plate 8. In this situation the nut 40 is turned clockwise and screwed onto the tip of the pivot shaft 34, thereby closing the first side-cover 6 on the first side-plate 8.

Second Embodiment

In the first embodiment, the first side-cover 6 pivots around a pivot shaft 34 that is parallel to the spool shaft 20, but it is also possible to let the first side-cover 6 pivot around a shaft that is parallel to an axis intersecting the spool shaft 20.

Figure 6:
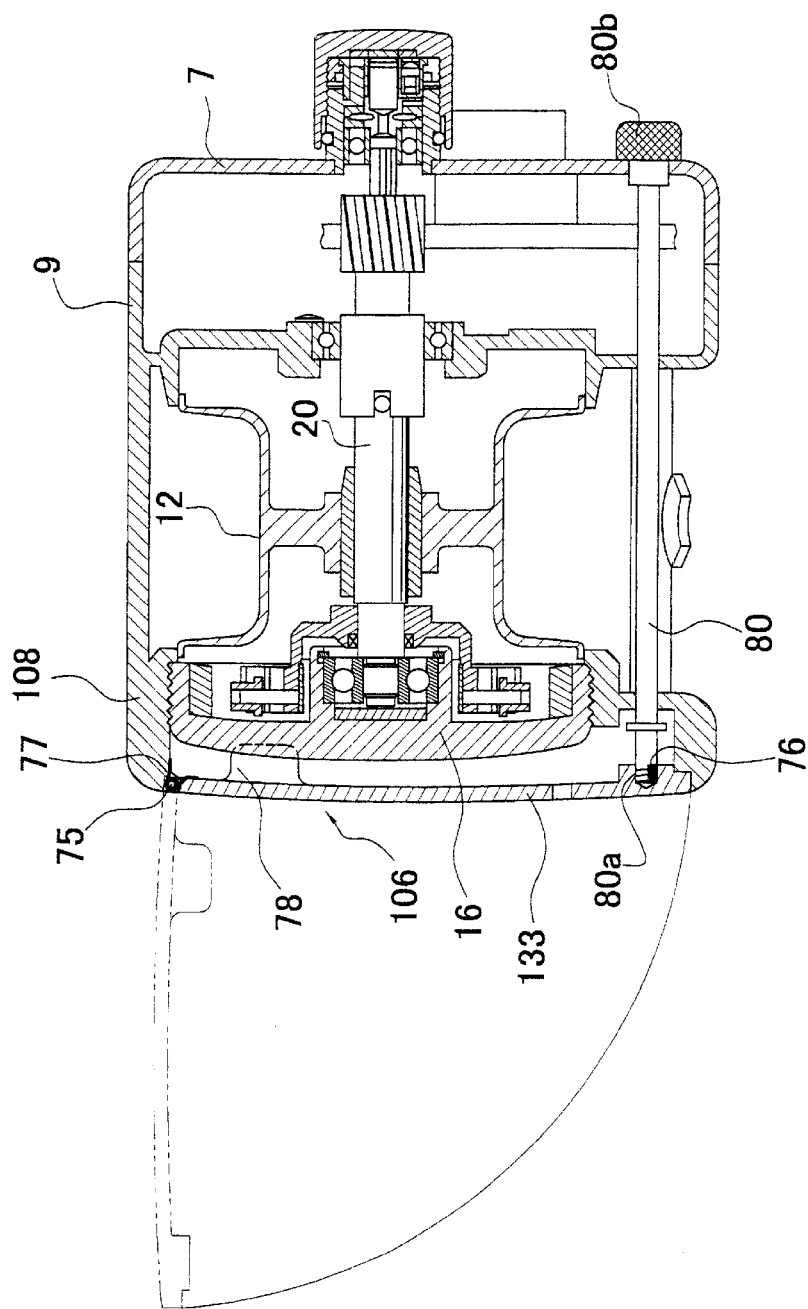
FIG. 6 is a view pertaining to a second embodiment, corresponding to FIG. 3.

According to the second embodiment as shown in FIG. 6, the first side-cover 106 is attached to the outer peripheral portion of the first side-plate 108, pivotally around a pivot shaft 75. The pivot shaft 75 shaft is provided at the outer peripheral portion of the first side-plate 108, parallel to an axis that intersects the spool shaft 20.

The first side-cover 106 can swing between a closed position indicated by the solid line in FIG. 6 and an open position indicated by the phantom line. The first side-cover 106 is urged towards the open position by a twisted coil spring 77 disposed around the pivot shaft 75. A threaded hole 76 is formed on the inner surface of the first side-cover 106 on the outer peripheral side opposite to the pivoting portion. The tip of a detachable shaft 80 is screwed into this threaded hole 76.

A protrusion 78 projecting inward is provided on the inner surface of the first side-cover 106. This protrusion 78 is provided either in one piece with or separately from the cover 33. When the spool support member 13 is screwed into the first side-plate 108 and the nub 16 has been set into a certain rotational position, the protrusion 78 is provided on the path that is passed by the nub 16 as it is tightened by twisting it to a certain location, so that the protrusion 78 does not contact the nub 16, and if the nub 16 has not been tightened enough and deviates from that certain location, it abuts against the protrusion 78. If such a protrusion 78 is provided, the first side-cover 106 cannot be put into the closed position unless the spool support member 13 has been properly tightened in the first side-plate 108. Therefore, it is possible to avoid an improper setting of the spool support member 13 due to carelessness during manufacture or use. Also, if the screw loosens, the spool support member 13 stops turning as soon as the nub 16 abuts against the protrusion portion 78, which stops the loosening. Moreover, since the protrusion 78 is provided on the path that is passed by the nub 16 as it is tightened by twisting it to a certain location, the nub 16 does not abut against the protrusion 78 even if attrition has shifted the certain location toward a direction corresponding to a further turning of the nub 16 (usually clockwise from the certain position).

The detachable shaft 80 is mounted in the two side-plates 108 and 9, rotatively and movably over a certain distance in the axial direction, and its base end protrudes from the second side-cover 7. An externally threaded portion 80a to be screwed into the threaded hole 76 is formed on the tip of the detachable shaft 80, and an operating knob 80b for turning the detachable shaft 80 is attached to its base end. The first side-cover 106 can be opened from the closed position to the open position by turning this operating knob 80b.

When the first side-cover 106 is closed and the operating knob 80b is turned counterclockwise, the detachable shaft 80 is removed from the first side-cover 106, and the spring force of the twisted coil spring 77 swings the first side-cover 106 towards the open position. To close the first side-cover 106, the first side-cover 106 is manually swung back into the closed position, and the operating knob 80b is turned clockwise, thereby screwing the detachable shaft 80 into the threaded hole 76 in the first side-cover 106 to keep the first side-cover 106 closed.

Third Embodiment

Figure 7:
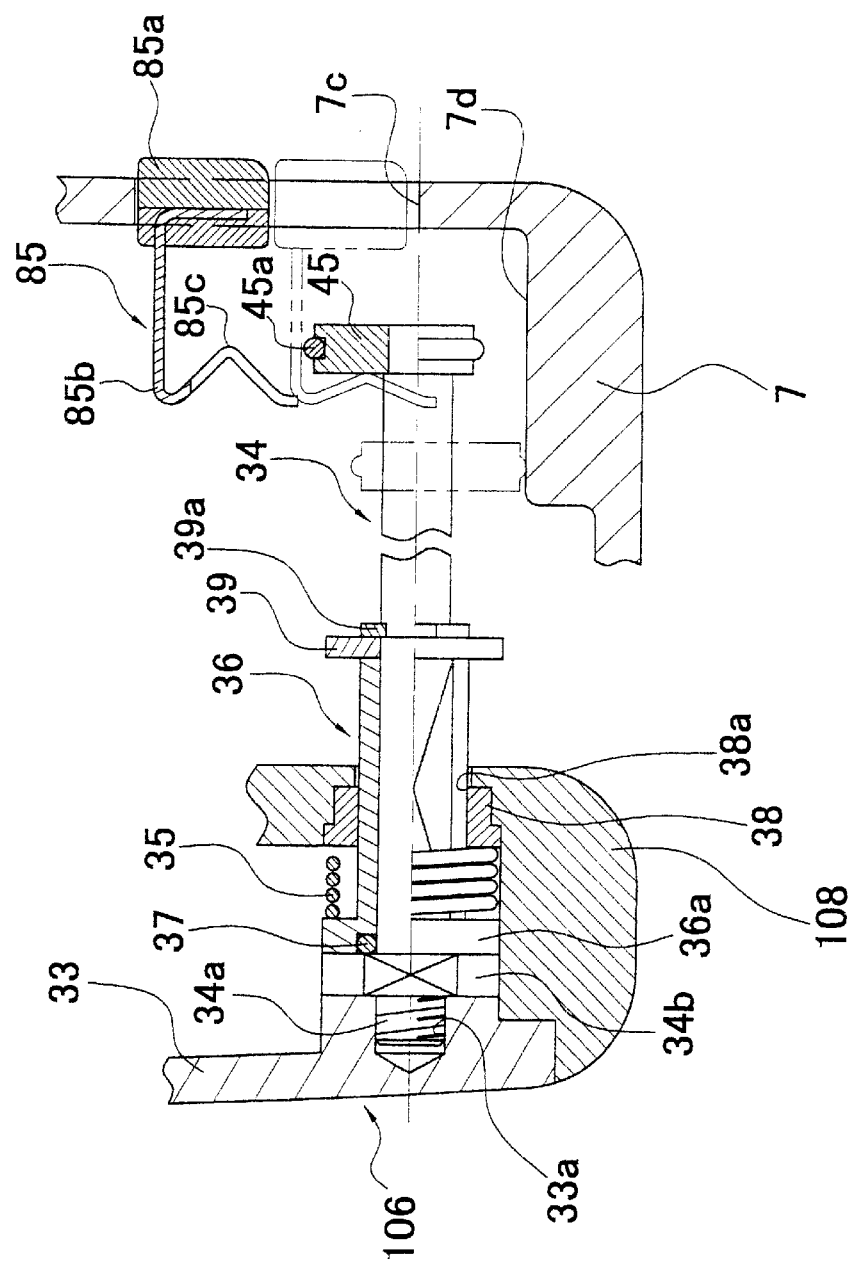
FIG. 7 is a view pertaining to a third embodiment, corresponding to FIG. 4.

In the first embodiment, the base end of the pivot shaft 34 is held by a screw. However, it is also possible to hold the base end of the pivot shaft 34 with a sliding locking member 85, as shown in FIG. 7. Moreover, it is also possible to effectively maintain its pivotal orientation when it is in the open position.

FIG. 7, a locking disk 45 is fixed eccentrically to the base end of the pivot shaft 34. An O-ring 45a for retaining the first side-cover 106 in the open position is attached to the outer peripheral surface of the locking disk 45. On the inner peripheral surface of the second side-cover 7, an abutting portion 7d is formed, which is contacted by the O-ring 45a. The locking disk 45 on the pivot shaft 34 is furthest away from the abutting portion 7d when the first side-cover 106 is in the closed position. As the first side-cover 106 is pivoted from the closed position to the open position, the locking disk 45 shifts together with the pivot shaft 34 to the left in the axial direction, rotates as indicated by the phantom line in FIG. 7, and the O-ring 45a contacts the abutting portion 7d, thereby maintaining the open position. Thus, the pivotal orientation of the open position is effectively maintained, and the first cover 6 is kept from swinging. It is also possible to dispose the locking disk 45 is concentrically to the pivot shaft 34 and cut away a portion of the periphery of the locking disk 45 to form a D-shape, so that the cut-away portion is opposite from the abutting portion 7d during the closed position.

The locking member 85 includes a slide portion 85a and a locking piece 85b. The slide portion 85a is disposed slidably on a lateral face of the second side-cover 7. The locking piece 85b is fixed to the slide portion 85a. The slide portion 85a can be shifted radially, guided, for example, by a long hole 7c that extends in the radial direction. With a retaining mechanism that is not shown in the drawings, the slide portion 85a is retained in an unlocked position indicated by the solid line in FIG. 7 or in a locked position indicated by the phantom line. The locking piece 85b is an elastic band-shaped piece of metal hose base end is disposed parallel to the pivot shaft 34, and whose tip is bent towards the pivot shaft. Moreover, the tip is dented and forms an angle that protrudes toward the locking disk 45. Bent to an angle, this tip is divided into two parts that can span the pivot shaft 34, and a convex portion 85c of the angle abuts against the left side of the locking disk 45 in FIG. 7. In this situation, the locking piece 85b is bent elastically and, acting on the locking disk 45, urges the pivot shaft 34 to the right in FIG. 7, retaining the pivot shaft 34 in the closed position.

The locking is not limited to locking with a locking piece, and as long as the pivot shaft 34 can be retained in the closed position, any form of locking is acceptable.

Fourth Embodiment

Figure 8:
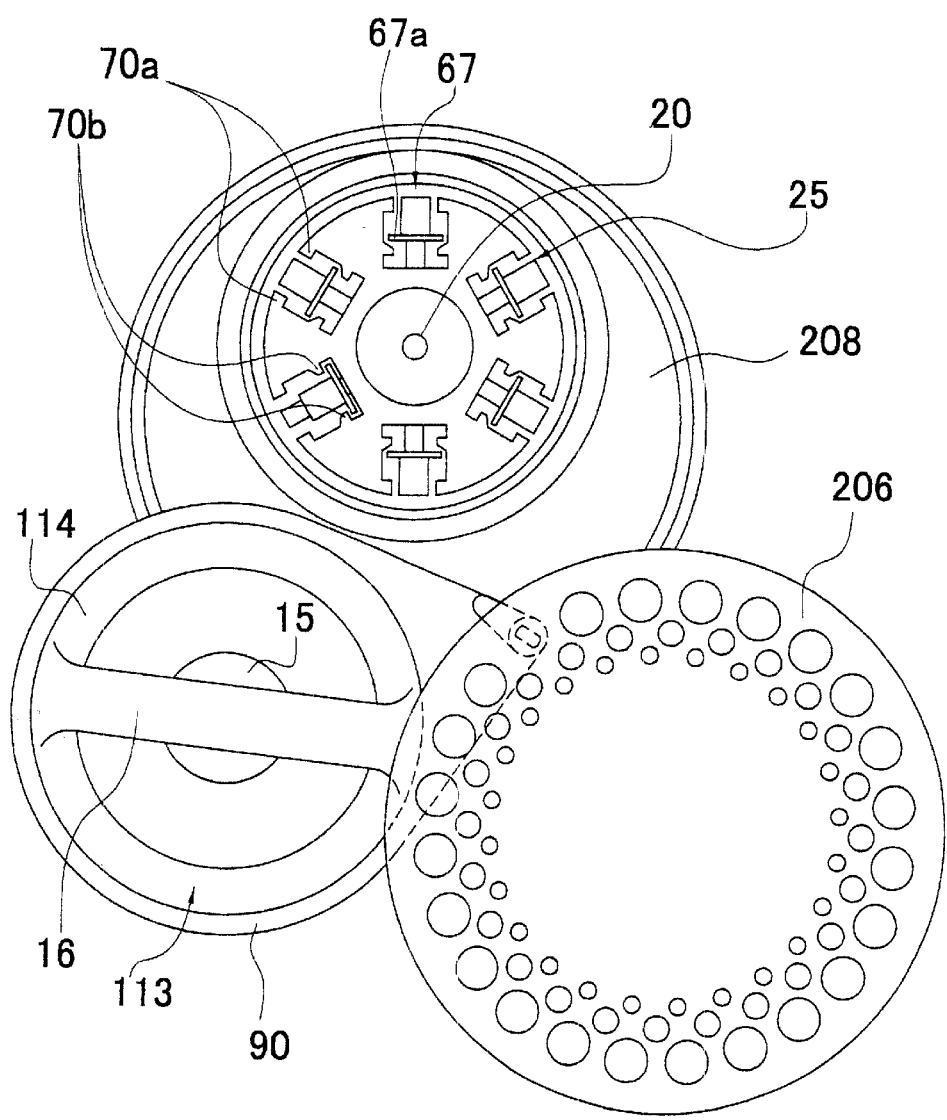
FIG. 8 is a view pertaining to, corresponding to FIG. 5.
Figure 9:
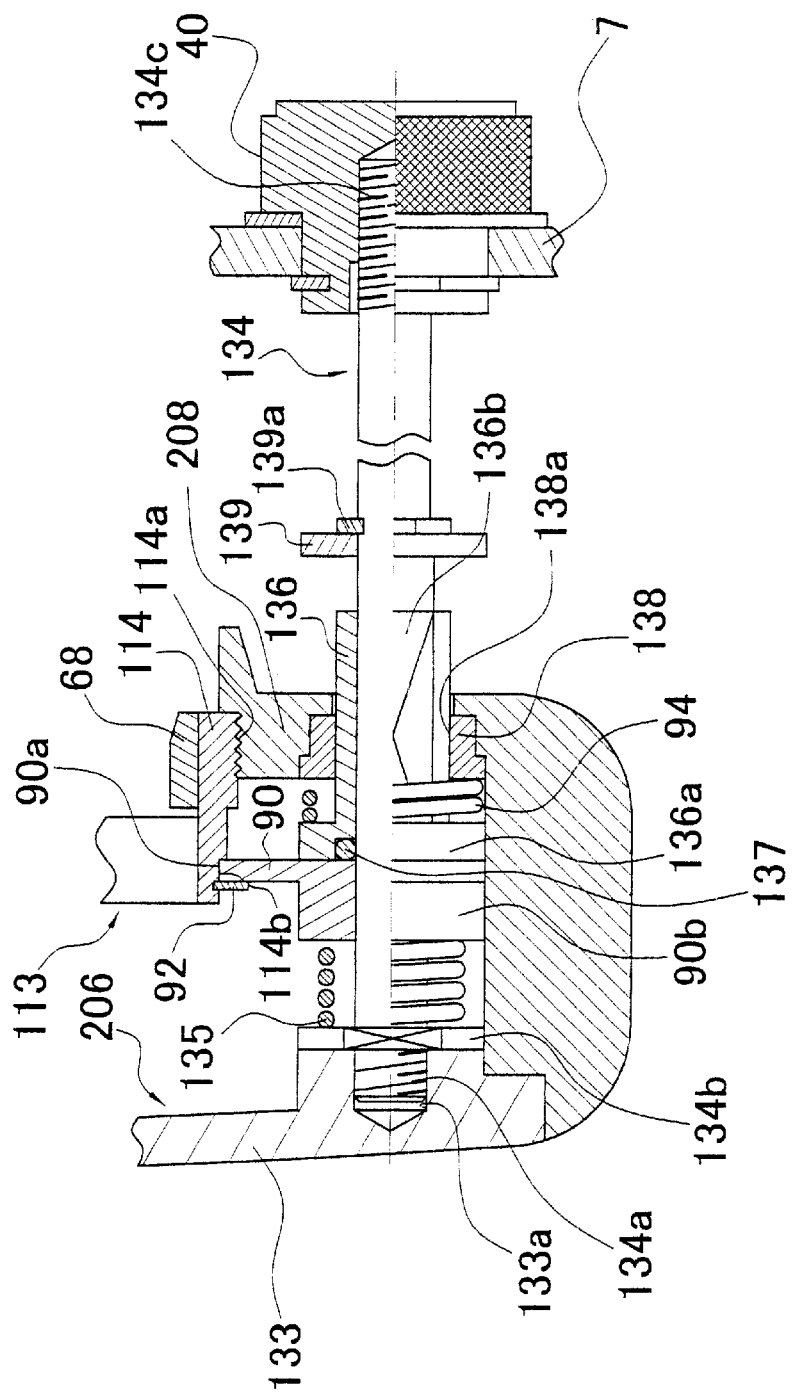
FIG. 9 is a view pertaining to a fourth embodiment, corresponding to FIG. 4.

As shown in FIGS. 8 and 9, it is also possible to attach the spool support member 113, in addition to the first side-cover 206, pivotally to the first side-plate 208. In this fourth embodiment, both pivot around the same pivot shaft 134, but it is also possible to let them pivot around different pivot shafts. Furthermore, it is also possible to let the first side-cover 6 pivot around a shaft that is parallel to an axis intersecting the spool shaft 20, as shown in the second embodiment.

In FIGS. 8 and 9, the spool support member 113 is disposed rotatively but immovably with respect to the axial direction in a pivot frame 90. The pivot frame 90 is a plate-shaped member, whose shape is substantially that of a tear obtained by connecting a large circle and a small circle. A circular opening 90a in which the spool support member 113 is disposed is formed in the large circle. A step portion 114b is formed in the outer peripheral surface of the ring portion 114 of the spool support member 113, and a retaining ring 92 is disposed adjacent to the step portion 114b. The opening 90a is fitted into this step portion 114b, and the spool support member 113 is disposed rotatively in the pivot frame 90. The retaining ring 92 is disposed adjacent to the step portion 114b. This retaining ring 92 prevents the spool support member 113 in the opening 90 from shifting axially. In the small circle, a boss 90b is formed, penetrated by the pivot shaft 134. The boss 90b is disposed rotatively in this penetration portion, so that the pivot frame 90 is supported pivotally by the pivot shaft 134.

As in the first embodiment, a threaded portion 134a that is screwed into the threaded hole 133a is formed at the tip of the pivot shaft 134, and a tool-interlocking portion 134b with a larger diameter is formed adjacent to the threaded portion 134a. The threaded portion 134a is screwed into the cover 133. A compressed coil spring 135 is provided around the pivot shaft 134 between the boss 90b and the tool-interlocking portion 134b. As in the first embodiment, the purpose of this coil spring 135 is to urge the first side-cover 206 outward.

A pipe member 136 piercing the first side-plate 208 is arranged concentrically around the pivot shaft 134, next to the boss 90b. The tip of the pivot shaft 134 is supported rotatively by the pipe member 136. The base end of the pivot shaft 134 is supported rotatively by the second side-plate 9 and protrudes outward beyond the second cover 7. The pipe member 136 supports the pivot shaft 134 not only rotatively, but also such that the pivot shaft 134 cannot shift axially. A large diameter portion 136a is formed on the tip of the pipe member 136, and an O-ring 137 for restricting the pivoting speed is mounted inside this large diameter potion 136a.

A compressed coil spring 94 is arranged between the large diameter portion 136a and the first side-plate 208. The purpose of this coil spring 94 is to urge the pivot frame 90 outward in the axial direction. A parallel cut-away portion 136b is formed in the outer surface of the pipe member 136, except for the portion of the large diameter potion 136a. A support member 138 having an oval hole 138a for supporting the cut-away portion 136b non-rotatively but movably in the axial direction is screwed to the first side-plate 208. A check disk 139 for checking the axial shifting of the pivot shaft 134 is fastened with a snap ring 139a in a certain distance to the base end of the pipe member 136. The first side-cover 206 can move in the axial direction over the distance afforded by the gap between the base of the pipe member 136 and the check disk 139. By retaining the pipe member 136 between this check disk 139 and the tool interlocking portion 134b after shifting the first side-cover 206, the pivot shaft 134 cannot be shifted axially with respect to the pipe member 136. Also, when the first side-cover 206 is opened, the check disk 139 abuts against the first side-plate 208, thus determining its axial position. Thus, the first side-cover 206 is mounted, pivotally and movably in the axial direction over a certain distance, to the first side-plate 208, and can be opened and closed without falling off the first side-plate 208.

A threaded portion 134c is formed on the base end of the pivot shaft 134. The threaded portion 134c is screwed into a nut 40, which is mounted to the second side-cover 7 rotatively but immovably with respect to the axial direction.

When the threaded portion 134c is separated from the nut 40 by turning the nut 40 counterclockwise, the pivot shaft 134 is urged by the coil spring 135 to the left in FIG. 9. Then, the locking disk 45 contacts the pipe member 136, and the pipe member 136 abuts against the pivot frame 90, so that it cannot move any further to the left, thereby stopping the pivot shaft 134. At the same time, the cover 133, too, moves to the left, and the first side-cover 206 opens. As the first side-cover 206 opens, it pivots under its own weight. The pivoting speed is adjusted to an appropriate speed with the O-ring 137. In this embodiment, only the first side-cover 206 opens.

Subsequently, the spool support member 113 is turned counterclockwise, and the spool support member 113 is removed from the first side-plate 208. At the moment it has been removed, the check disk 139 moves to the left, urged by the coil spring 94, until it abuts against the first side-plate 208. In this embodiment, the boss 90b moves outward beyond the first side-plate 208 and pivots under its own weight.

Here, one pivot shaft 134 pivotally supports two members, which makes the configuration of the support portion simple. Moreover, the spool support member 113 is not separated from the first side-plate 208, so that there is no danger of misplacing the spool support member 113.

Fifth Embodiment

Figure 10:
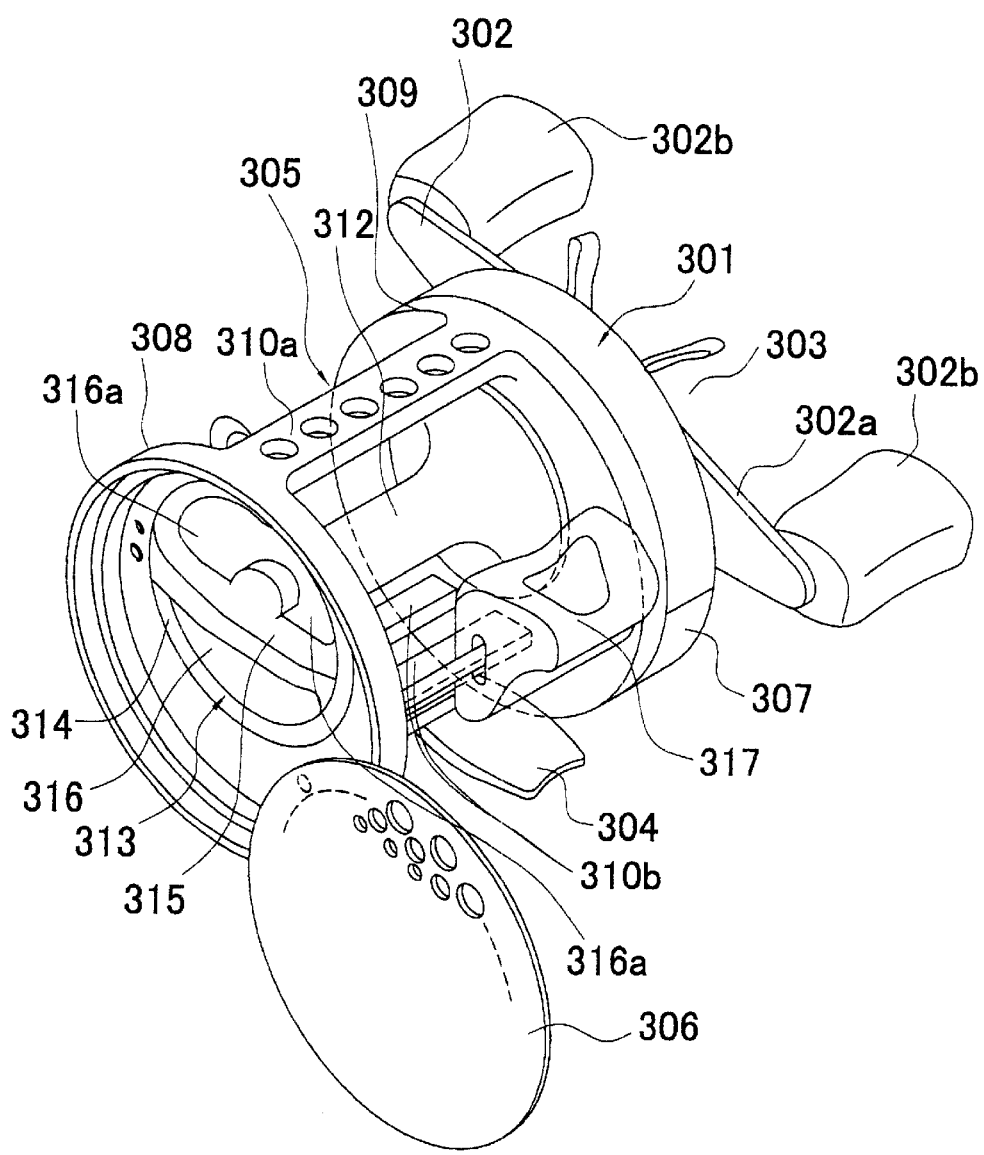
FIG. 10 is an oblique view of a dual-bearing reel in a fifth embodiment of the present invention.
Figure 11:
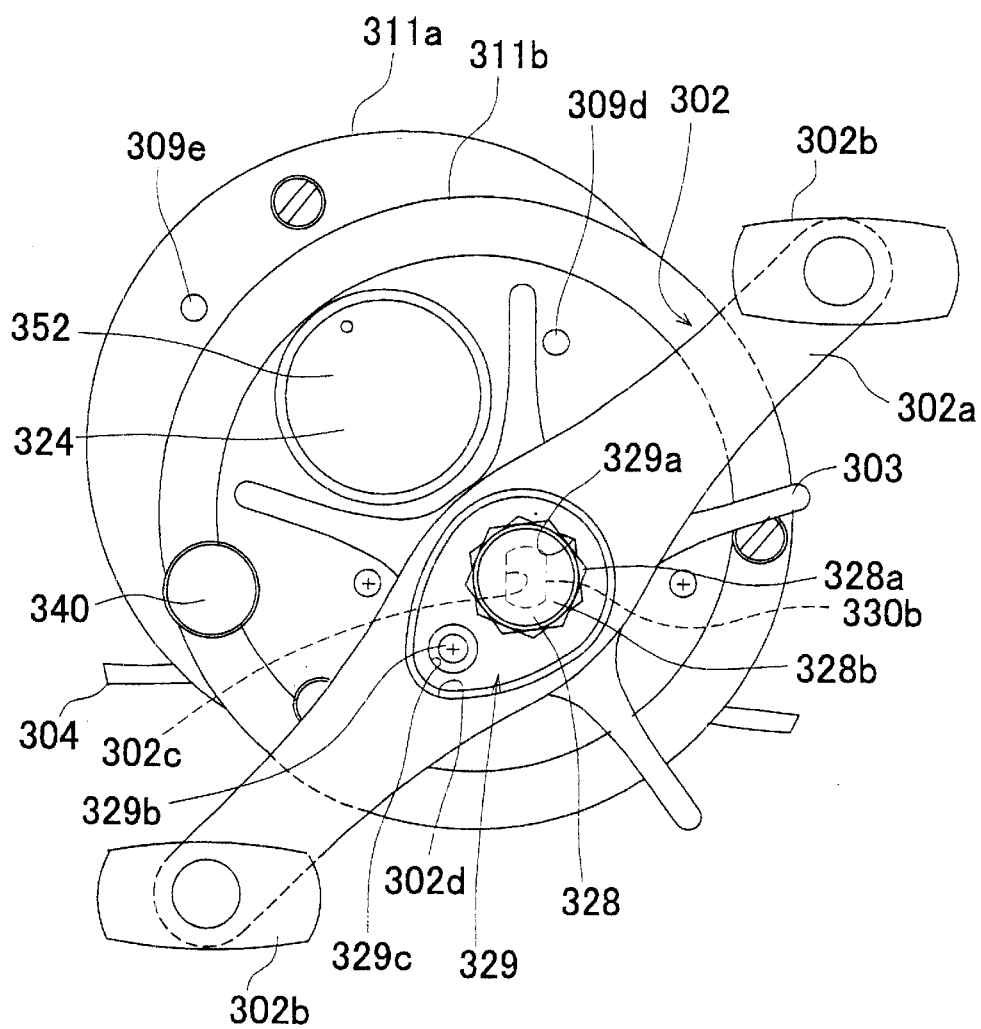
FIG. 11 is a lateral view of the dual-bearing reel in FIG. 10, seen from the left.
Figure 12:
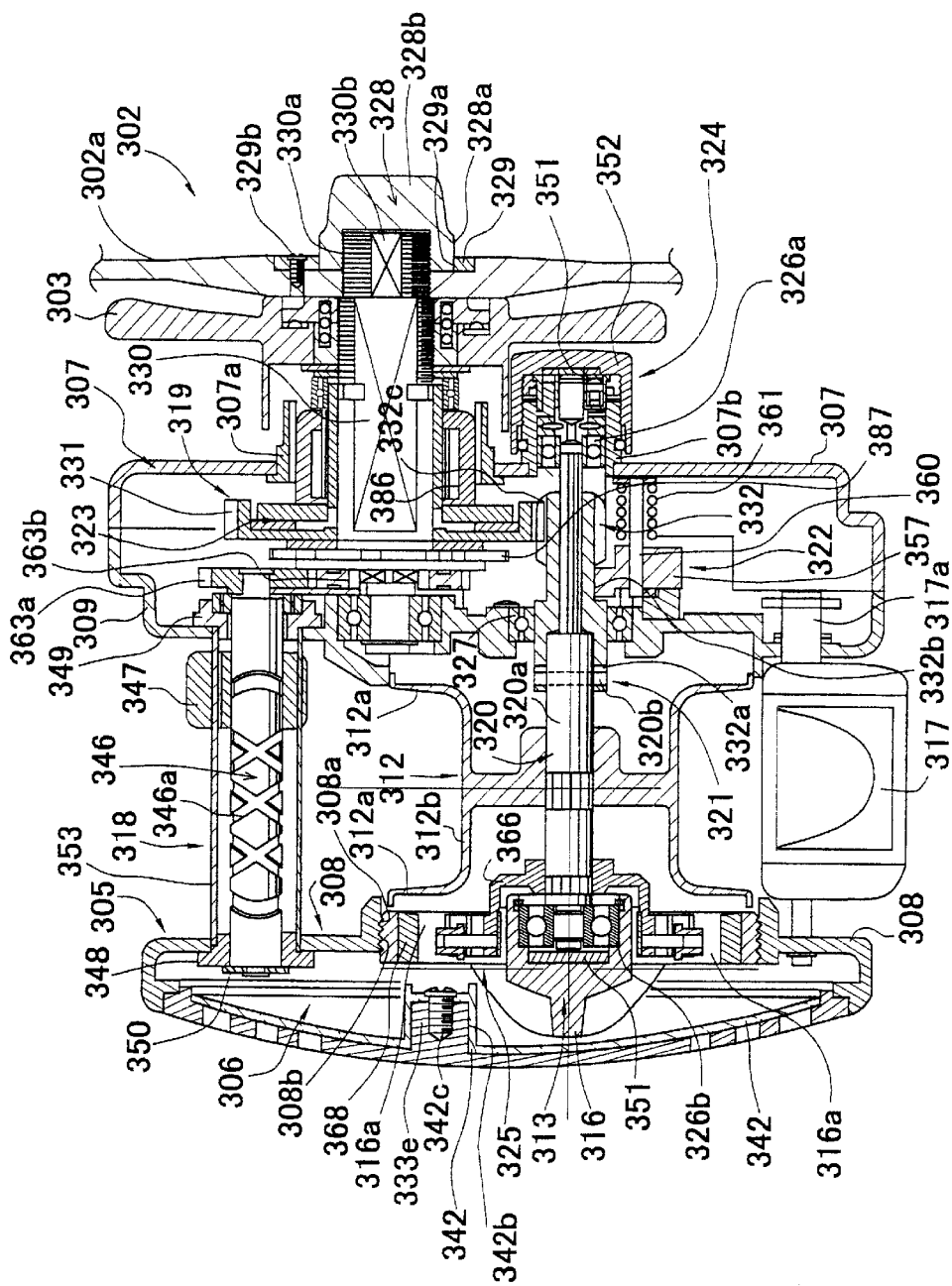
FIG. 12 is a plane section view of the dual-bearing reel in FIG. 10.

The dual-bearing reel shown in FIGS. 10 to 12, which is a fifth embodiment of the present invention, is a round dual-bearing reel for bait-casting. This reel is provided with a reel body 301, a handle 302 for turning a spool, and a star drag 303 for adjusting drag. The handle 302 is disposed on one side of the reel body 301. The star drag 303 is disposed on the same side of the reel body 301 as the handle 302.

Configuration of the Handle

The handle 302 is of the double-handle type and has a plate-shaped arm portion 302a and grips 302b that are attached rotatively to both ends of the arm portion 302a. As shown in FIG. 12, the arm portion 302a is mounted non-rotatively to the near end of a handle shaft 330, and is fastened to the handle shaft 330 with a nut 328. The near end of the handle shaft 330 has a smaller diameter than its other portions, and an externally threaded portion 30a and a parallel beveled portion 330b are formed on its outer peripheral surface. Screwing the nut 328 to the externally threaded portion 330 fastens the arm portion 302a to the handle shaft 330.

As shown in FIG. 11, an oval hole 302c is formed into the portion where the arm portion 302a is mounted onto the handle shaft 330. The arm portion 302a is interlocked non-rotatively with the handle shaft 330 by engaging the beveled portion 330b with this oval hole 302c. Around the oval hole 302c, a substantially tear-shaped accommodating recess 302*d* is formed, which is formed by the envelope curve around a large diameter portion and a small diameter portion arranged at a distance from the large diameter portion.

A retainer 329, which is fitted into the accommodating recess 302*d* of the arm portion 302*a*, keeps the nut 328 from rotating. The nut 328 is a hexagon cap nut having a nut portion 328*a* of certain length that is formed in the shape of a hexagon and a cap portion 328*b* shaped like a truncated cone whose diameter is smaller than that of the nut portion 328*a* and gradually becomes smaller. The axial length of the nut portion 328*a* (i.e., the "certain length") is 0.8 to 1.3 times the thickness of the retainer 329. If the axial length of the nut portion 328*a* is set to this range, then the nut portion 328*a* substantially does not protrude from the outer surface of the retainer 329, and the chances of touching this portion by hand or contacting it with the fishing line are reduced. The tip of the cap portion 328*b* is smoothly rounded, so that it will hardly obstruct the fishing line.

The retainer 329 is a plate-shaped member made of metal, such as a piece of substantially tear-shaped stainless steel, whose perimeter follows along the edge portion of the accommodating recess 302*d*, which is formed by the envelope curve around a large diameter portion and a small diameter portion arranged at a distance from the large diameter portion. The thickness of the retainer 329 is substantially equal to the depth of the accommodating recess 302*d*. As a result, the retainer 329 is substantially coplanar with the outside surface of the arm portion 302*a*. A star-shaped interlocking hole 329*a* with twelve corners is formed in the portion of the retainer 329 that corresponds to the large diameter portion and interlocks with the outer corners of the nut portion 328*a*. A small screw 329*b* having a threaded portion and a head for preventing it from falling off and for limiting its rotation is mounted to the portion that corresponds to the small diameter portion. With this small screw 329*b*, the retainer 329 is fastened to the arm portion 302*a*. In the portion of the retainer 329 where the small screw is mounted, a circular mounting recess 329*c* is formed, so that the head of the small screw 329*b* does not protrude from the outer surface of the arm portion 302*a*. Thus, the fishing line will hardly be obstructed by or cut into the retainer 329 and the small screw 329*b*, because they do not protrude from the arm portion 302*a*.

Configuration of the Reel Body

The reel body 301 is made of metal, such as an aluminum alloy or a magnesium alloy for example, and includes a frame 305, and a first side-cover 306 and a second side-cover 307 attached to the two sides of the frame 305. A spool 312 for winding fishing line is rotatively and detachably provided on a spool shaft 320 (see FIG. 12) inside the reel body 301. When seen from the outside in spool shaft direction, the first side-cover 306 is circular, and the shape of the second side-cover 307 is that of two eccentric flat disks lying on top of each other, with the two outer rims intersecting one another.

As shown in FIG. 12, the spool 312, a clutch lever 317, and a level-wind mechanism 318 are disposed inside the frame 305. The clutch lever 317 functions as a thumb rest when pitching. The level-wind mechanism 318 is for uniformly winding fishing line around the spool 312. A gear mechanism 319, a clutch mechanism 321, a clutch control mechanism 322, a drag mechanism 323, and a casting control mechanism 324 are disposed in the space between the frame 305 and the second side-cover 307. The gear mechanism 319 transmits rotational force from the handle 302 to the spool 312 and the level-wind mechanism 318. The clutch control mechanism 322 controls the clutch mechanism 321 in response to the operation of the clutch lever 317. The drag mechanism 323 dampens the spool 312. The casting control mechanism 324 adjusts the resistance that develops when the spool 312 rotates. Also, a centrifugal braking mechanism 325 for preventing backlash when casting is disposed between the frame 305 and the first side-cover 306.

Configuration of the Frame

As shown in FIGS. 12 to 15, the frame 305 includes a first and a second side-plates 308 and 309 disposed in opposition to each other at a predetermined spacing, and upper and lower connecting portions 310*a* and 310*b* connecting the side-plates 308 and 309 into one unit. Of the first and second side-plates 308 and 309, the second side-plate 309 is on the side where the handle 302 is attached, that is, on the right side in FIG. 12, and together with the second side-cover 307, it forms part of a first cylindrical portion 311*a* and a second cylindrical portion 311*b* that has substantially the same diameter as the first cylindrical portion 311*a*. Inside the first cylindrical portion 311*a*, there is a cylindrical first space, and inside the second cylindrical portion 311*b*, there is a second space contiguous to the first space. The outer rim of the second cylindrical portion 311*b* is arranged eccentrically downward towards the front, so that it intersects with the outer rim of the first cylindrical portion 311*a*, and the second cylindrical portion 311*b* protrudes in the spool shaft direction from the first cylindrical portion 311*a*. Furthermore, a portion of the outer peripheral surface of the first cylindrical portion 311*a* and the second cylindrical portion 311*b* overlap in the spool shaft direction.

The first side-plate 308, which is disposed on the side opposite to where the handle 302 is attached, that is, on the left side in FIG. 12, is a flat and cylindrical element with a base, having a space inside that is circular when seen in spool shaft direction. A circular opening 308*a* for attaching and detaching the spool 312 is formed slightly above the center of the first side-plate 308. An internally threaded portion 308*b* is formed on the inner peripheral surface of the opening 308*a*. A spool support member 313, which supports the left end of the spool shaft 320 serving as the rotation shaft for the spool 312, is provided detachably at the internally threaded portion 308*b*.

Figure 15:
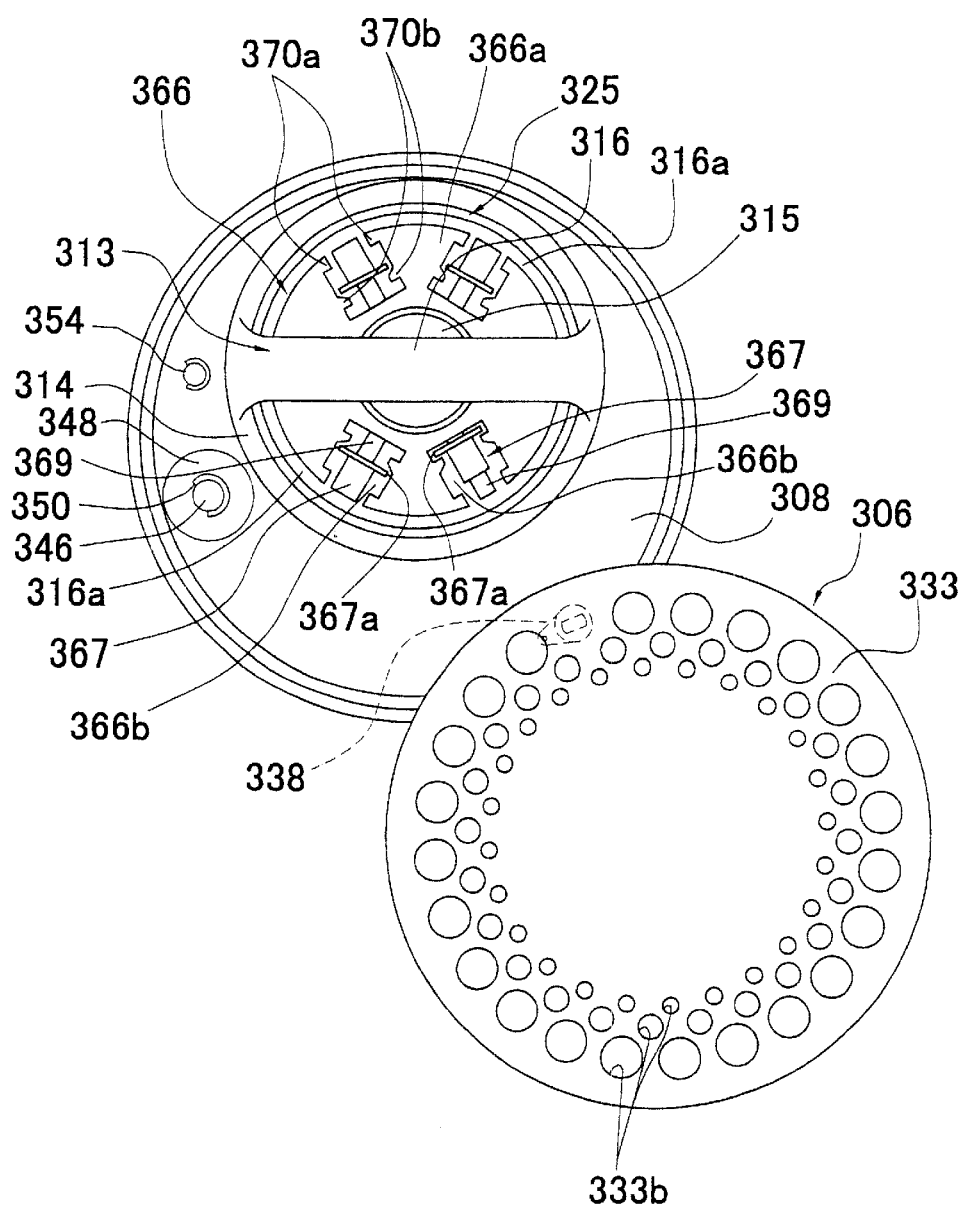
FIG. 15 is a lateral view of the reel body in FIG. 14, taken from the right as the first side-cover is open.

As shown in the FIGS. 10, 12 and 15, the spool support member 313 includes a ring portion 314, a cylindrical bearing portion 315 having a base, and a nub 316. The ring portion 314 is installed detachably in the opening 308*a*. The bearing portion 315 is arranged concentrically to the ring portion 314 to the inner side of the ring portion 314. The nub 316 connects the ring portion 314 with the bearing portion 315 and is for turning the spool support member 313. These portions are formed in one piece of plastic or metal.

On the outer peripheral surface of the ring portion 314, an externally threaded portion 314*a* is formed, which can be screwed into the internally threaded portion 308*b* formed in the opening 308*a*. A brake liner 368 of a centrifugal braking mechanism 325 is fastened to the inner peripheral surface of the ring portion 314.

A bearing 326*b* for rotatively supporting one end of the spool shaft 320 is provided at the inner peripheral surface of the bearing portion 315. A friction plate 351 of the casting control mechanism 324 is mounted on its bottom.

Curved convexly outward in axial direction, the nub 316 connects the ring portion 314 with the bearing portion 315 and is disposed along a diameter direction of these. As a result, openings 316*a* are formed on both sides of the nub 316. It is possible to see the side of the spool 312 and to introduce one's fingertips through these openings 316*a*.

Figure 14:
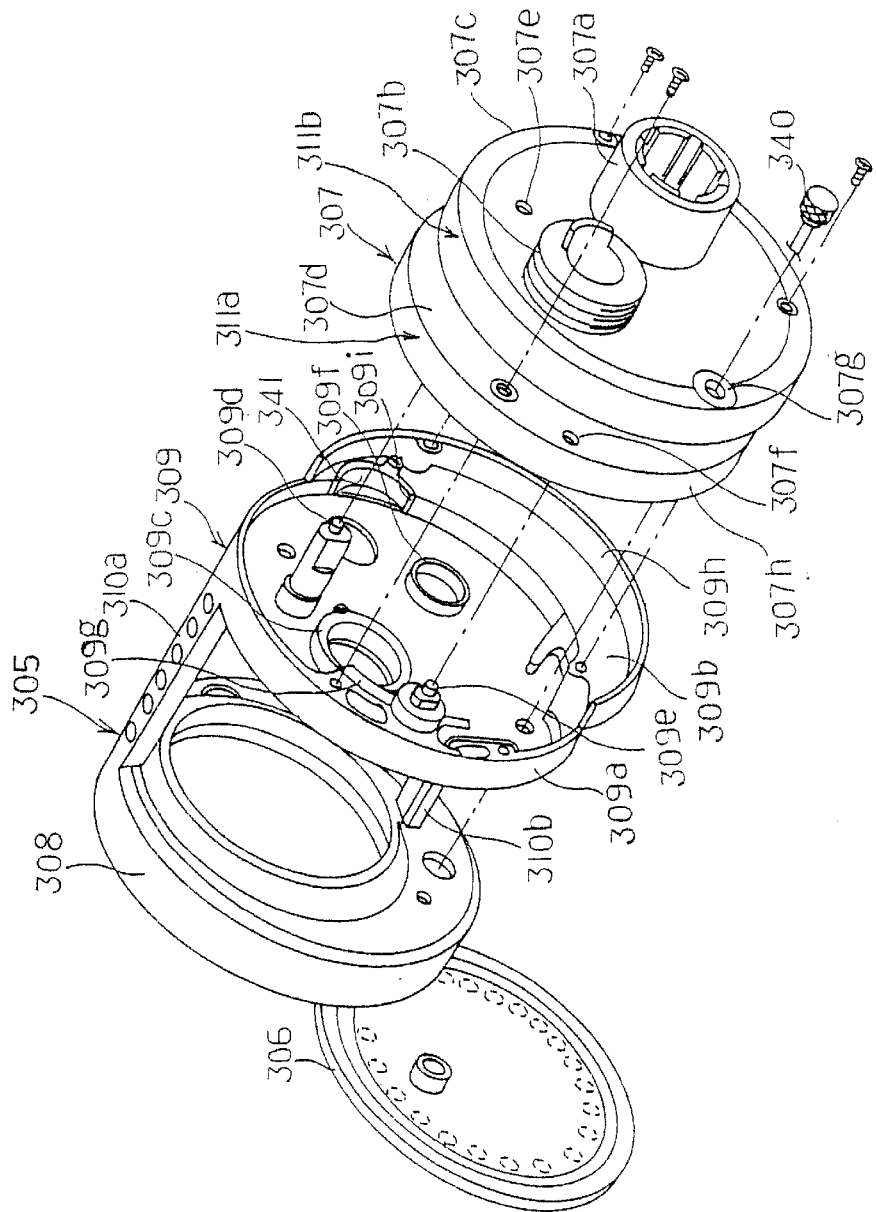
FIG. 14 an exploded oblique view of the reel body common to the embodiments.

As shown in FIG. 14, the second side-plate 309 includes a flat cylindrical mounting portion 309a having a base and a protruding portion 309b. The mounting portion 309a has the same diameter as the first side-plate 308. The protruding portion 309b is formed eccentrically on the edge of the mounting portion 309a diagonally downward to the front, such that its outer rim intersects with the outer rim of the mounting portion 309a. The protruding portion 309b is formed as a crescent-shaped circular arc. A boss 309c supporting a pinion gear 332, which is described below, is formed in the base of the mounting portion 309a. Two upright positioning pins 309d and 309e for positioning the second side-cover 307 are provided on both sides of the boss 309c. On the tips of the positioning pins 309d and 309e, nose portions with small diameter are formed, and the second side-plate 309 is positioned with respect the second side-cover 307 by inserting these nose portions into positioning holes 307e and 307f formed in the second cover 307.

Furthermore, diagonally below of the boss 309c, a boss 309f supporting the base end of the handle shaft 330 is formed. The boss 309f is formed at a portion where the outer rim of the mounting portion 309a overlaps with the outer rim of the protruding portion 309b. Moreover, a slightly dented, arcuate guide portion 309g for guiding the clutch plate 355 of the clutch control mechanism is formed between the boss 309c and the positioning pin 309e. Extending from the forward rim of the mounting portion 309a to the base of the protrusion portion 309b, an inner/outer peripherally penetrating cutout 309i for arranging a gear member 363 (see FIG. 20) of the level-wind mechanism 325. To cover this cutout 309i, a cover member 341 that is curved like a circular arc is detachably provided along the outer edge of the gear member 363a. On the protruding portion 309b, an edge portion 309h that is curved like a circular arc is formed along the outer edge of the crescent-shaped portion from the portion that points diagonally downward towards the front. The edge portion 309h is formed on the protruding portion 309b to the position where the two outer rims intersect.

Figure 13:
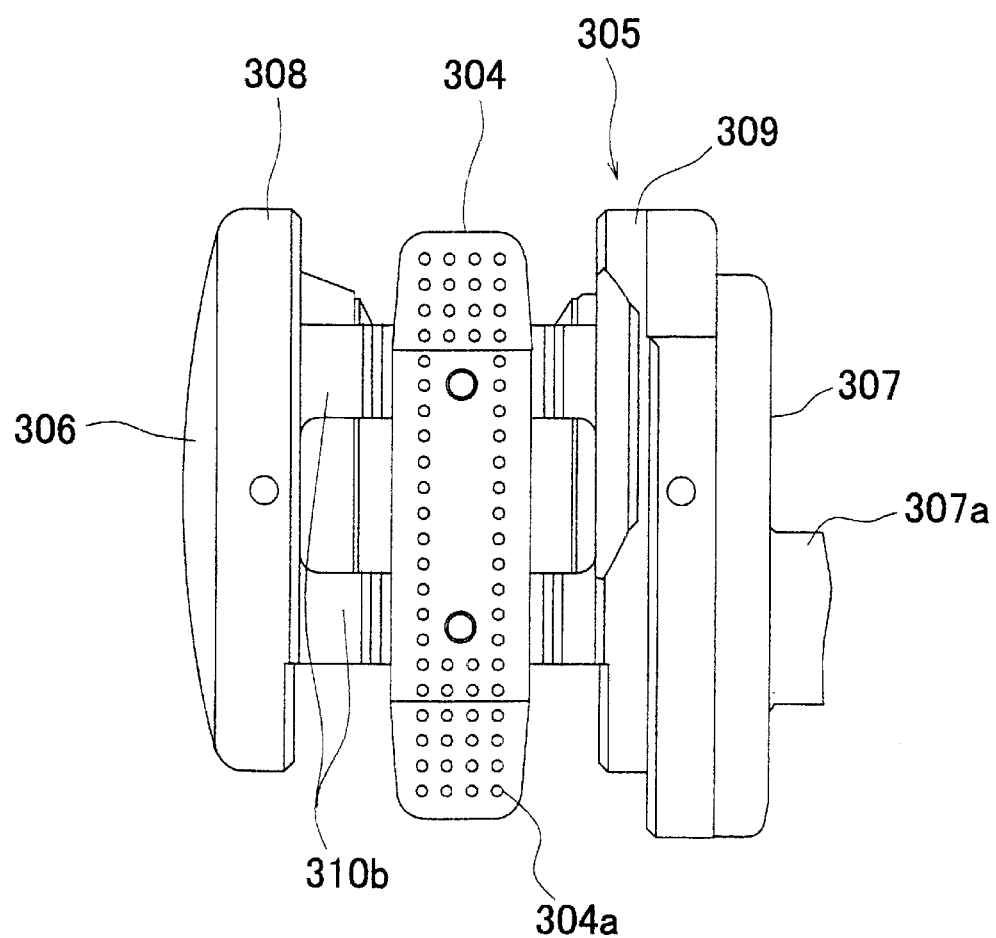
FIG. 13 is a basal view of the dual-bearing reel in FIG. 10.
Figure 16:
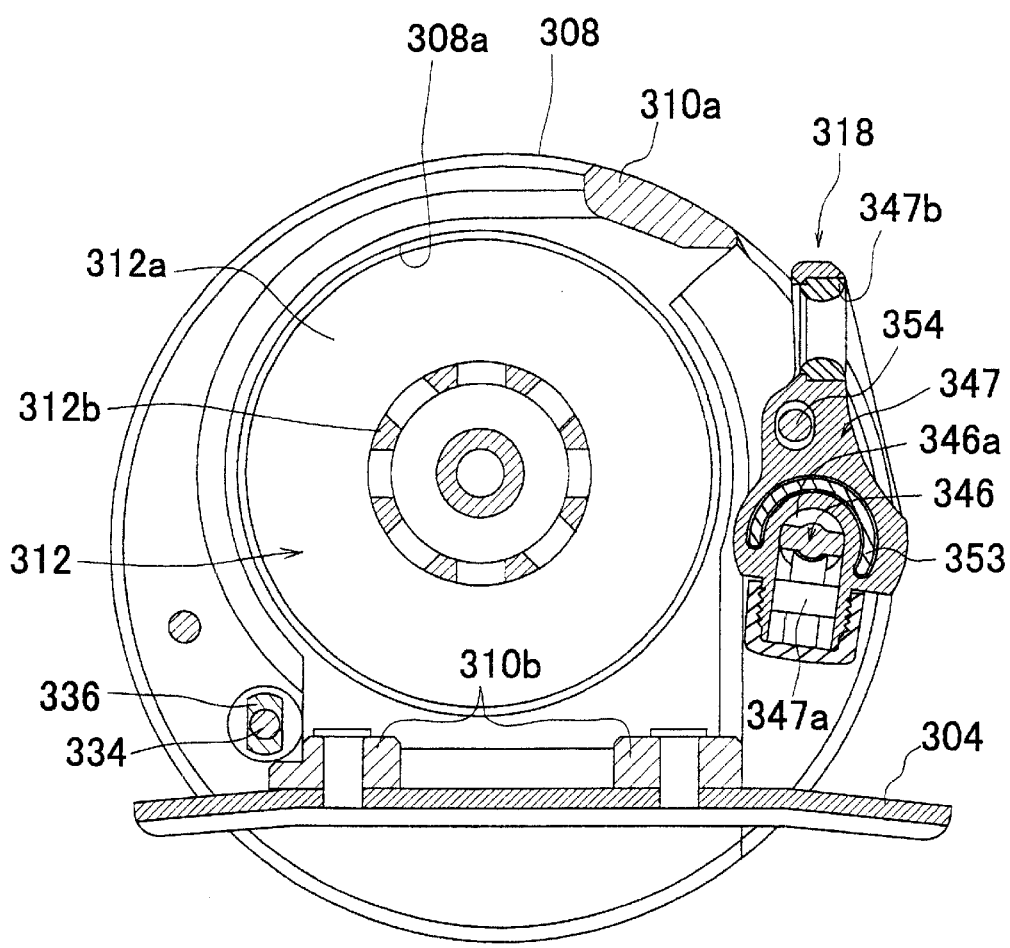
FIG. 16 is a transverse sectional view of the FIG. 14 dual-bearing reel.

The upper connecting portion is arranged in the same plane as the perimeter of the side-plates 308 and 309, whereas a pair of front and rear connecting portions 310b are formed inwardly from the perimeter. As shown in FIGS. 13 and 16, extending front to rear, an oblong rod-mounting leg 304 made of metal, such as an aluminum alloy for example, for mounting the reel to a fishing-rod is riveted, to the lower connecting portions 310b. On the rear surface of the rod-mounting leg 304, multiple anti-slipping portions 304a made of circular concavities are formed, especially at both ends. These anti-slipping portions 304a are made by press-forming, and are also provided to enhance the flexural rigidity of the rod-mounting leg 304 due to the work-hardening effect.

Configuration of the First Side-cover

Figure 17:
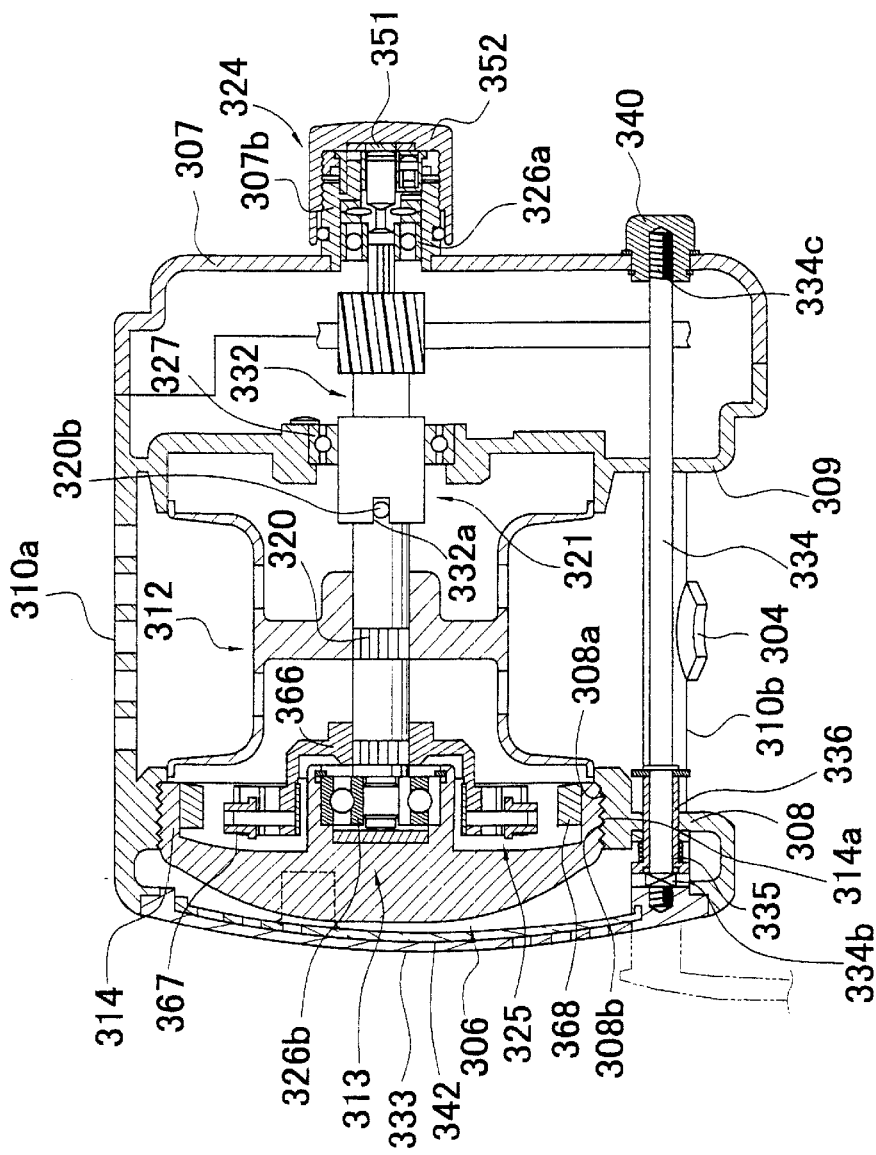
FIG. 17 is a longitudinal sectional view of the FIG. 14 dual-bearing reel.
Figure 18:
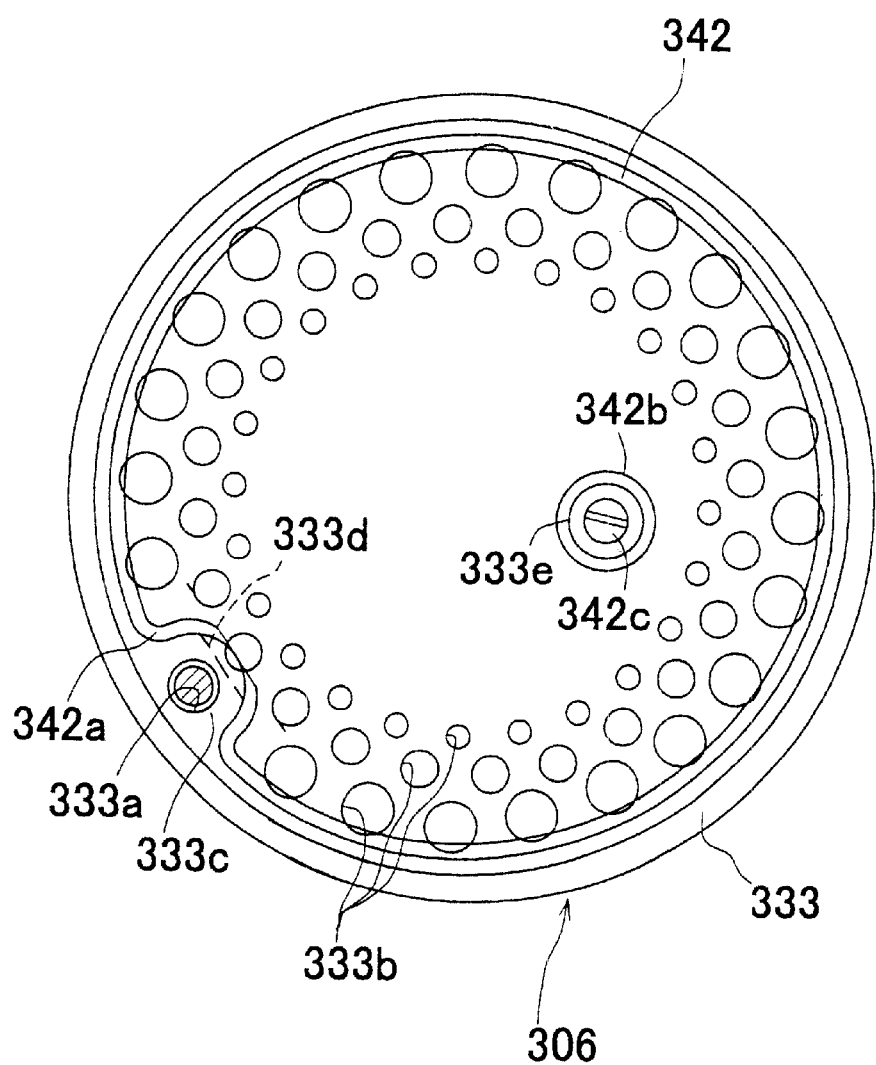
FIG. 18 is a front elevational view of the inside surface of the first side-cover of the FIG. 14 reel.

As shown in FIGS. 15, 17 and 18, the first side-cover 306 can be opened or closed on the frame 305, and is mounted pivotally to the first side-plate 308 to make it possible to attach and detach the spool 312. The first side-cover 306 can be pivoted from the closed position shown in FIGS. 12 and 13 to the open position shown in FIGS. 10 and 15. The first side-cover 306 includes a disk-shaped cover 333 covering the outer side of the first side-plate 308, a pivot shaft 334 for pivotally supporting the cover 333, and a coil spring 335 urging the cover 333 away from the first side-plate 308.

The cover 333 is made of a piece of metal that is slightly curved convexly to the outside so as to cover the first side-plate 308. In order to enhance its appearance and to make it lighter, its peripheral portion is provided with multiple round holes 333b of varying diameter, spaced apart in the circumferential direction and the radial direction. On the inner surface near the periphery of the cover 333, a threaded hole 333a for attaching the pivot shaft 334 is formed. Around the threaded hole 333a, a boss 333c is formed protruding from the outer edge of the threaded hole 333a toward the center. At the boundary with the bottom of the boss 333c, an interlocking portion 333d is cut out linearly and substantially along the circumferential direction. Moreover, an inwardly protruding attaching portion 333e (see FIG. 12) is formed on the inner surface of the cover 333, slightly deviating from its center. When the cover 333 is fitted to the first side-plate 308, the attaching portion 333e is located at a position near the nub 316 of the spool support member 313 where it can abut against the spool support member 313, so that the spool support member 313 is not loosened by rotation in a loosening direction.

A sealing member 342 for preventing the intrusion of dirt or liquids through the round holes 333b is attached to the inner surface of the cover 333. The sealing member 342 is made of a synthetic resin, such as ABS (acrylonitrile butadiene styrene) resin, and is translucent so that its inside can be seen. As shown in FIG. 18, the sealing member 342 is curved convexly outward in adaptation to the curving of the cover 333, and its outer diameter follows the inner edge of the cover 333. At the portion of the sealing member 342 that runs along the boss 333c, a recess 342a is formed, which interlocks with the interlocking portion 333d. Also, a cylindrical portion 342b covering the attaching portion 333e is provided on the inner surface of the sealing member 342. Penetrating this cylindrical portion 342b, a screw 342c is screwed into the attaching portion 333e, and the sealing member 342 is fastened to the rear surface of the first side-cover 306 with the recess 342a and the cylindrical portion 342b. That is to say, to attach the sealing member 342 to the first side-cover 306, the cylindrical portion 342b is slipped onto the attaching portion 333e, after fitting the recess 342a against the interlocking portion 333d. Then, the screw 342c is screwed into the attaching portion 333e to fasten the sealing member 342 to the inner surface of the first side-cover 306.

Figure 19:
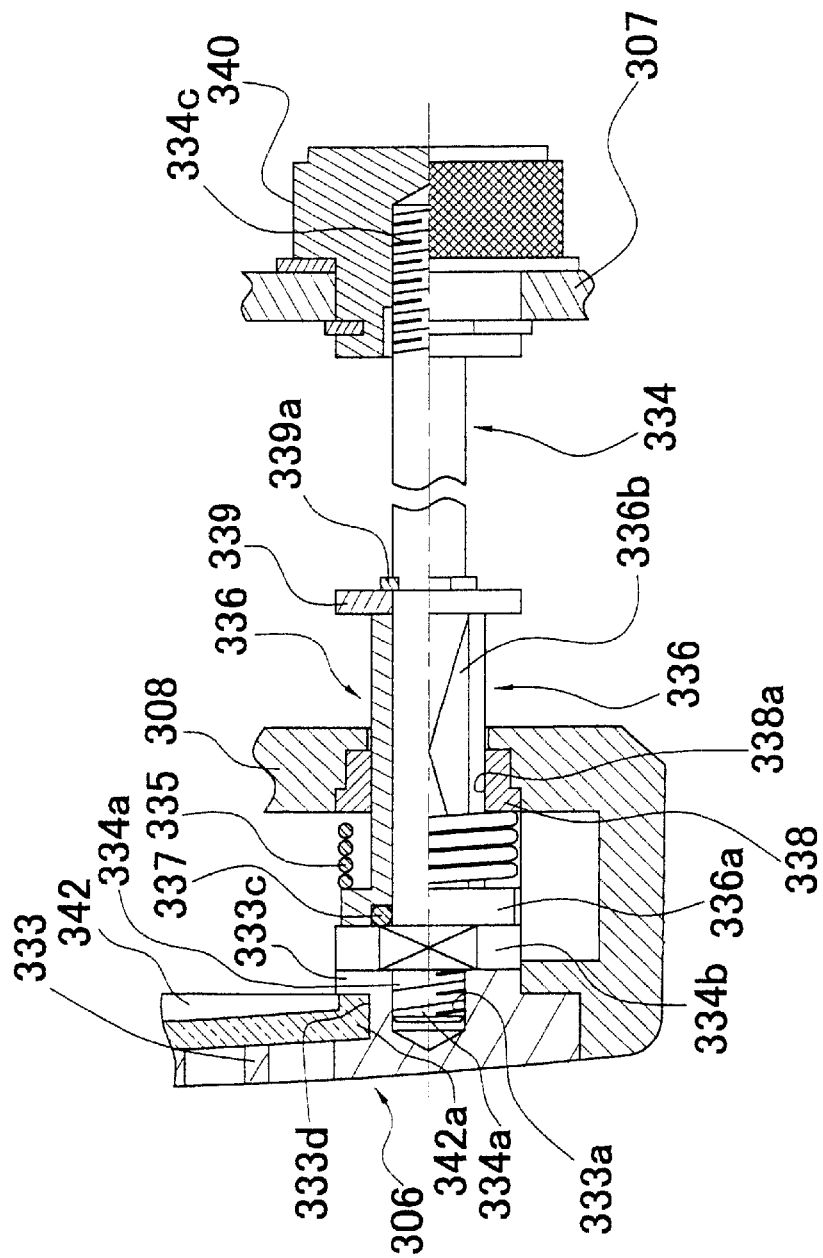
FIG. 19 is a fragmentary section view of the FIG. 12 reel.

As shown in FIG. 19, a threaded portion 334a that is screwed into the threaded hole 333a is formed on the tip of the pivot shaft 334. A tool interlocking portion 334b with a larger diameter is formed adjacent to the threaded portion 334a. The threaded portion 334a is screwed into the cover 333, thereby fastening the pivot shaft 334 to the cover 333.

A pipe member 336 penetrating the first side-plate 308 is arranged concentrically around the pivot shaft 334. The tip of the pivot shaft 334 is supported rotatively by the pipe member 336. The base end of the pivot shaft 334 is supported rotatively by the second side-plate 309, and protrudes outward beyond the second cover 307. The pipe member 336 supports the pivot shaft 334 not only rotatively, but also such that the pivot shaft 334 cannot shift axially. A large diameter portion 336a is formed on the tip of the pipe member 336, and an O-ring 337 for restricting the pivoting speed is mounted inside this large diameter potion 336a.

Between the large diameter portion 336a and the first side-plate 308, a compressed coil spring 335 is mounted around the pivot shaft 334. Parallel cut-away portions 336b are formed in the outer peripheral surface of the pipe member 336, except for the portion of the large diameter potion 336a. A support member 338 having an oval hole 338a for supporting the cut-away portions 336b non-rotatively but movably in the axial direction is screwed to the first side-plate 308. A check disk 339 for checking the axial shifting of the pivot shaft 334 is fastened with a snap ring 339a to the base end of the pipe member 336. By retaining the pipe member 336 between this check disk 339 and the tool interlocking portion 334b, the pivot shaft 334 cannot be shifted axially with respect to the pipe member 336. Also, when the first side-cover 306 is opened, the check disk 339 abuts against the first side-plate 308, thus determining its axial position. Thus, the first side-cover 306 is mounted, pivotally and movably in the axial direction over a certain distance, to the first side-plate 308, and can be opened and closed without falling off the first side-plate 308.

A threaded portion 334c is formed on the base end of the pivot shaft 334. The threaded portion 334c is screwed into an detachable nut 340, which is a knob (handling part) for opening and closing the first side-cover 306. The nut 340 is mounted to the second side-cover 307 rotatively but immovably with respect to the axial direction. When the threaded portion 334c is separated from the nut 340 by turning the nut 340 counterclockwise, the pivot shaft 334 is urged by the coil spring 335 to the left in FIG. 13. Thereby, the cover 333, too, shifts to the left and the first side-cover 306 opens. As the first side-cover 306 opens, it pivots under its own weight. The pivoting speed is adjusted to an appropriate speed with the O-ring 337.

Configuration of the Second Side-cover

As shown in FIGS. 11 to 14, the second side-cover 307 has a lateral surface shaped like two eccentric, intersecting circles that are equal to the ones of the second side-plate 309. The second side-cover 307 is fastened to the second side-plate 309 with, for example, three screws. The second side-cover 307 includes a mounting portion 307c and a protruding portion 307d. Following the protruding portion 309b of the second side-plate 309, the shape of the mounting portion 307c is that of a flat cylinder with a base, and the mounting portion 307c has the same diameter as the protruding portion 309b. The crescent-shaped protruding portion 307d forms an arc that is arranged eccentrically diagonally to the rear above the edge of the mounting portion 307c in opposition to the mounting portion 309a of the second side-plate 309. A cylindrical boss 307a for supporting the handle shaft 330 and a cylindrical boss 307b for supporting the spool shaft 320 are attached to the base portion of the mounting portion 307c, spaced apart at a certain distance and protruding outward. The boss 307a is arranged coaxially with the boss 309f formed on the second side-plate 309, and the boss 307b is arranged coaxially with the boss 309c. A positioning hole 307e for positioning the second side-cover 307 is formed in front of the boss 309c. Furthermore, a knob hole 307g, which rotatively supports the nut 340 for opening and closing the first side-cover 306, is formed behind the boss 307a.

On the protruding member 307d, an edge portion 307h that is curved like a circular arc is formed along the outer edge of the crescent-shaped portion from the portion that points diagonally upward towards the rear. This edge portion 307h is arranged concentrically with the mounting portion 309a of the second side-plate 309, and is connected to the edge portion 309h of the protruding portion 309b so as to yield the shape of two eccentric flat disks lying on top of each other. This realizes a configuration in which the outer peripheral surfaces (edge portions 309h and 307h) of the two cylindrical portions 311a and 311b overlap with respect to the direction of the spool axis. The edge portions 309h and 307h are both arc-shaped, so that they can be easily made by a cutting process.

A positioning hole 307f is formed in the protruding portion 307d at a position opposite the positioning hole 307e with the boss 307b being disposed between the positioning holes 307e and 307f. As mentioned above, the positioning plate 309 is positioned with respect to the second side-cover 307 by inserting the nose portions of the upright positioning pins 309d and 309b provided on the second side-plate 309 into the positioning holes 307e and 307f, and the bosses 309c, and 309f are centered and arranged coaxially to the bosses 307b and 307a.

With this reel body 1, two eccentric cylindrical portions 311a and 311b, which define two cylindrical spaces and whose outer rims intersect, are formed inside the second side-plate 309 and the second side-cover 307. Thus, by providing a protruding the second cylindrical portion 311b, which protrudes to the outside, the outer surface can be made easily by cutting, even though the rotation efficiency is enhanced. Thus, it is possible to improve the appearance and decorativeness of the reel body of this dual-bearing reel having a protruding portion.

Configuration of the Spool

As shown in FIG. 12, the spool 312 has saucer-shaped flange portions 312a on both ends and a cylindrical spool body 312b between the two flange portions 312a. The spool 312 also has a cylindrical boss 312c, formed in one piece with it at substantially the center with respect to the axial direction on the inner side of the spool body 312b. The spool 312 is fixed non-rotatively, for example by serration coupling, to the spool shaft 320 penetrating the boss 312c. The fixing is not limited to serration coupling, and other coupling methods such as key coupling or spline coupling can be employed as well.

The spool shaft 320 penetrates the second side-plates 309 and extends beyond the second side-cover 307. This end of the spool shaft 320 is supported rotatively with a bearing 326a at the boss 307b, which is provided at the second side-cover 307. The other end of the spool shaft 320 is supported rotatively with the bearing 326b as described above.

The right end of the large diameter portion 320a of the spool shaft 320 is disposed at a portion where the second side-plate 309 is pierced, and an engaging pin 320b, which is part of the clutch mechanism 321, is fixed in the spool shaft 320 at this place. The engaging pin 320b pierces the large diameter portion 320a through its diameter and protrudes radially from both sides.

Configuration of Other Components

As shown in FIG. 12, the clutch lever 317 is disposed at the rear end of the pair of side-plates 308 and 309 behind the spool 312. The clutch lever 317 slides vertically between the side-plates 308 and 309. On the side of the clutch lever 317 where the handle is mounted, an engagement shaft 317a, which is formed in one piece with the clutch lever 307, pierces the second side-plate 309. The engagement shaft 317a is engaged with the clutch control mechanism 322.

As shown in FIGS. 12 and 16, the level-wind mechanism 318 is disposed between the two side-plates 308 and 309 in front of the spool 312. The level-wind mechanism 318 includes a threaded shaft 346 on whose outer peripheral surface intersecting helical grooves 346 are formed, and a fishing line guide portion 347, which can be shifted back and forth on the threaded shaft 346 in the spool shaft direction. The two ends of the threaded shaft 346 are supported rotatively by shaft support portions 348 and 349 provided at the side-plates 308 and 309. In FIG. 12, the left end of the threaded shaft 346 is held by an E-shaped retaining ring 350. The gear member 363a is attached to the right side of the threaded shaft 346 in FIG. 12. The gear member 363a meshes with a gear member 363b that is attached non-rotatively to the handle shaft 330. With this configuration, the threaded shaft 346 is linked to and rotated by a rotation of the handle shaft 330 in the direction taking up the line.

As shown in FIG. 16, the fishing line guide portion 347 is disposed around the threaded shaft 346 and is guided in the direction of the spool shaft 320 by a pipe member 353 and a guide shaft 354. A portion of the pipe member 353 is cut away over its entire axial length. The guide shaft 354 is disposed above the threaded shaft 346. An interlocking member 347a, which engages with the helical grooves 346a, is mounted rotatively on the fishing line guide portion 347 and is moved back and forth in the spool shaft direction by the rotation of the spool shaft 346. An oval guide ring 347b, through which the fishing line is passed, is provided on the upper end of the fishing line guide portion 347. The guide ring 347b can be made of a hard ceramic material such as SiC.

Figure 20:
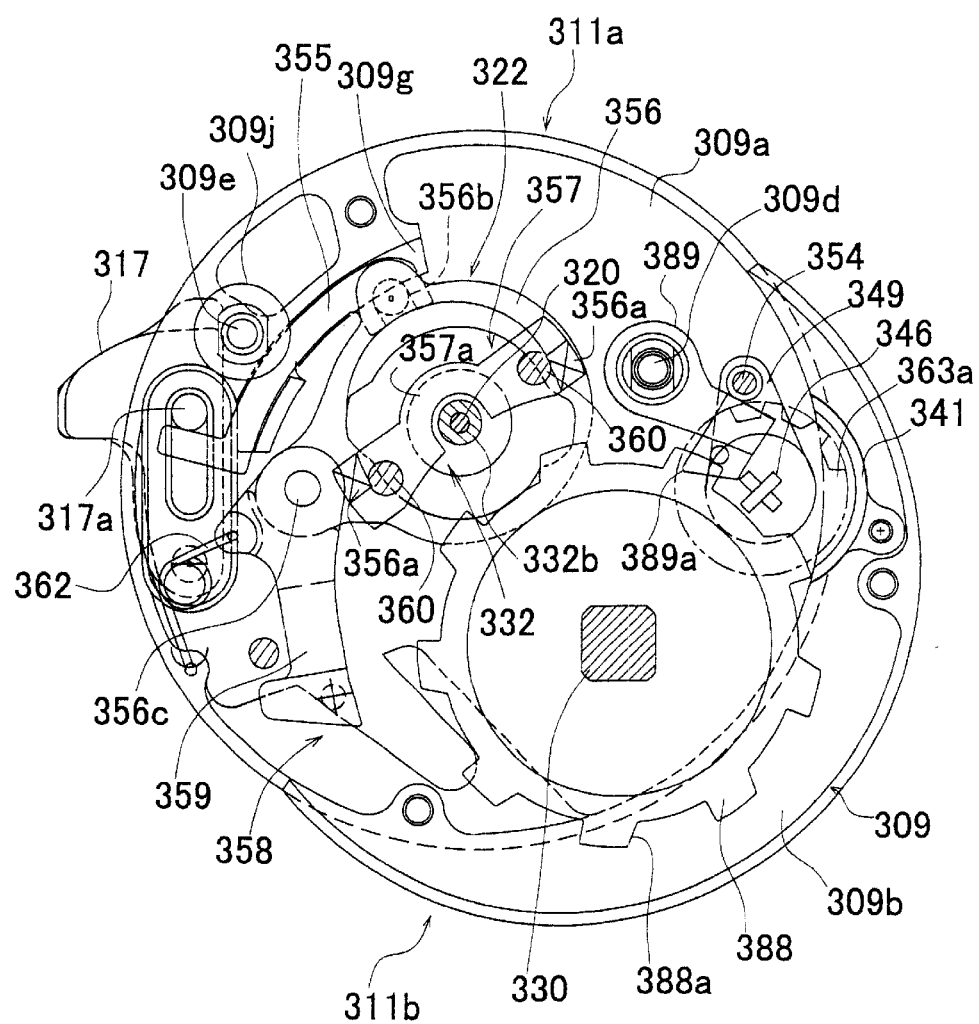
FIG. 20 is a lateral section view, seen with the second side-cover open.

The pipe member 353 interlocks with the shaft support portions 348 and 349. The guide shaft 354 is fixed to the side-plates 308 and 309 and the end of the guide shaft 354 at the second side-plate 309 protrudes further toward the side-cover 307. As shown in FIG. 20, the shaft support portion 349 is substantially tear-shaped. It supports the threaded shaft 346 rotatively at a portion where its diameter is large, and is pierced by the guide shaft 354 at a portion where its diameter is small, keeping the shaft support portion 349 from rotating.

As shown in FIG. 12, the gear mechanism 319 includes a handle shaft 330, a main gear 331 fixed to the handle shaft 330, and a cylindrical pinion gear 332 meshing with the main gear 331. The handle shaft 330 is supported rotatively by the boss 309f and the boss 307a, and a roller type one-way clutch 386 and a pawl type one-way clutch 387 prevent the handle shaft 330 from rotating in the direction unwinding the line (reverse rotation).

The one-way clutch 387 is provided between the boss 307a and the handle shaft 330. As shown in FIG. 20, the one-way clutch 387 includes a ratchet gear 388 and a ratchet pawl 389. The ratchet gear 388 is mounted non-rotatively to the handle shaft 330 between the main gear 331 and the gear member 363b. The ratchet pawl 389 can pivot around the positioning pin 309d. Substantially parallelogram-shaped ratchet teeth 388a protrude at certain intervals in the circumferential direction on the periphery of the ratchet gear 388. The ratchet pawl 389 keeps the handle shaft 330 from rotating in a direction unwinding the line by engaging with the ratchet teeth 388a. The tip of the ratchet pawl 389 is provided with control pieces 389a flanking the ratchet gear 388 on both sides. The control pieces 389a keep the ratchet pawl 389 close to the ratchet gear 388 during a rotation in the direction that winds up the line and separate the ratchet pawl 389 from the ratchet gear 388 during a rotation in the direction that unwinds the line. When the ratchet pawl 389 separates from the ratchet gear 388, the ratchet pawl 389 abuts the guide shaft 354 to prevent the ratchet pawl 389 from separating too much.

The main gear 331 is mounted rotatively on the handle shaft 330, and is coupled to the handle shaft 330 via the drag mechanism 323.

As shown in FIG. 12, the pinion gear 332 extends from outside of the second side-plate 309 to the inside thereof. The pinion gear 332 is cylindrical and is pierced by the spool shaft 320, on which it is mounted movably in the axial direction. A bearing 327 in the second side-plate 309 supports the left side of the pinion gear 332 in FIG. 12 rotatively and movably in the axial direction. A meshing groove 332a meshing with the engagement pin 320b is formed at the left end of the pinion gear 332 in FIG. 12. The meshing groove 332a and the engagement pin 320b form the clutch mechanism 321. A center portion of the pinion gear 332 is provided with a constricted portion 332b, and the right end of the pinion gear 332 is provided with a gear portion 332c meshing with the main gear 331.

As shown in FIG. 20, the clutch control mechanism 322 includes a clutch plate 355, a clutch cam 356, and a clutch yoke 357. The clutch plate 355 is engaged with the engagement shaft 317a. The clutch cam 356 is engaged with the clutch plate 355 and rotates around the spool shaft 320. The clutch cam 356 moves the clutch yoke 357 in the direction of the spool shaft 320. The clutch control mechanism 322 also includes a clutch return mechanism 358, which clutches the clutch mechanism 321 on when the spool 312 rotates in the direction winding up the line.

The clutch plate 355 is an arcuate plate-shaped member and is guided in the rotation direction by the guiding portion 309g formed in the second side-plate 309. A collar 309j on the positioning pin 309e forms a gap together with the guide portion 309g and prevents the clutch plate 355 from drifting off. One end of the clutch plate 355 extends to a position where it contacts the lower end of the engagement shaft 317a of the clutch lever 317, so that the clutch plate 355 moves counterclockwise in FIG. 20 when the clutch lever 317 is moved downward. The other end of the clutch plate 355 interlocks with the clutch cam 356, and the clutch plate 355 and the clutch cam 356 turn in cooperation around the spool shaft 320.

The clutch cam 356 is a substantially ring-shaped plate, provided rotatively around the spool shaft 320 in the boss 309c. A pair of oblique cam protrusions 356a is formed in opposition to one another at positions on the outer lateral surface of the clutch cam 356, flanking the spool shaft 320. An engaging pin 356b that is engaged with the clutch plate 355 is formed on the outer peripheral portion of the clutch cam 356. Furthermore, a coupling portion 356c for coupling with a return pawl 359 that is part of the clutch return mechanism 358 is also formed on the outer peripheral portion of the clutch cam 356.

The clutch yoke 357 is disposed in axial opposition to the clutch cam 356. The clutch yoke 357 is movable in the direction of the spool shaft 320, guided by two upright guide shafts 360, which are provided between the second side-plate 309 and the second side-cover 307, flanking the spool shaft 320. The clutch yoke 357 is urged inward in the axial direction by compressed coil springs 361 (see FIG. 12) that are provided around the guide shafts 360 between the second side-cover 307 and the clutch yoke 357. The clutch yoke 357 is provided with a semi-circularly arced engaging portion 357a that is engaged with the constricted portion 332b of the pinion gear 332. On a side surface opposing the clutch cam 356, the clutch yoke 357 is provided with inclined faces (not shown in the drawings) resting on the cam protrusions 356a. When the clutch cam 356 is turned counterclockwise in FIG. 20, the protrusions 356a lift the inclined faces and the clutch yoke 357 is moved to a clutch-off position on the right in FIG. 12. When the inclined faces are lowered from the protrusions 356a, the clutch yoke 357 is urged back into the clutch-on position by the coil spring 361. Shifting the clutch yoke 357 moves the pinion gear 332 in the spool shaft direction, so that the clutch mechanism 321 can be switched to a clutch-off state or to clutch-on state.

The clutch return mechanism 358 includes a return pawl 359 and a toggle spring 362. The return pawl 359 is coupled rotatively to the coupling portion 356c of the clutch cam 356, and the toggle spring 362 biases the return pawl 359.

Turning the clutch cam 357 shifts the return pawl 359, which is guided by the second side-plate 309, between a position where it contacts the ratchet teeth 388a of the ratchet gear 388 and a position where it is separated from the ratchet teeth 388a. The toggle spring 362 holds the return pawl 359 in these two positions.

With this clutch return mechanism 358, the return pawl 359 is guided by the second side-plate 309 and proceeds to a position where it is in contact with the ratchet teeth 388a when pushing the ratchet lever 317 down puts the clutch mechanism 321 into the clutch-off state. If, in this situation, turning the handle 302 rotates the handle shaft 330 in the direction winding up the line, then the return pawl 359 is pushed by the ratchet teeth 388a and shifts to the position away from the ratchet teeth 388a, the ratchet cam 356 turns clockwise in FIG. 20, and the clutch mechanism 321 returns to the clutch-on state.

The casting control mechanism 324 includes a plurality of friction plates 351 and a braking cap 352. The friction plates 351 are disposed on both ends of the spool shaft 320. The braking cap 352 is for adjusting the force with which the friction plates 351 are pressed against the spool shaft 320. The left friction plate 351 is provided inside the spool support member 313.

As shown in FIGS. 12 and 15, the centrifugal braking mechanism 325 includes a rotor 366, cylindrical sliders 367, and a brake liner 368. The rotor 366 is fixed to the spool shaft 320 so that it rotates together with the spool 312. The sliders 367 are attached to the rotor 366 at certain intervals in the circumferential direction and are movable in the radial direction. The brake liner 368 is fixed to the inner peripheral surface of the ring portion 314 and can be brought into contact with the sliders 367. The rotor 66 includes a circular plate 366a provided around the bearing portion 315. For example six recesses 366b are formed in the circular plate 366a, spaced apart at intervals in the circumferential direction. In these recesses 366b, two pairs of opposing interlocking projections 370a and 370b are formed at a certain distance in the radial direction. The interlocking projections 370a are formed projecting towards one another at an outer periphery of the circular plate 366a and prevent the sliders 367 from falling off. The interlocking projections 370b formed more to the inside than the interlocking projections 370a and prevent the sliders 367 from contacting the brake liner 368. Furthermore, guide shafts 369 are provided at the bottom surface of the recesses 366b, fanning out radially. Guided by the guide shafts 369, the sliders 367 can shift back and forth thereon.

The sliders 367 are cylindrical and are provided at their inward edge portions with collars 367a interlocking with the interlocking portions 370a and 370b. The diameter of those collars 367a is larger than that of the other portions. When the spool 312 rotates, centrifugal forces act on the sliders 367 and bring the sliders 367 into contact with the brake liner 368, thereby braking the spool 312. If the collars 367a are located inwardly beyond the interlocking projections 370b, then the collars 367a abut the interlocking projections 370b when centrifugal forces are at work, so that the sliders 367 cannot be brought into contact with the brake liner 368. The braking force of the centrifugal braking mechanism 325 can then be adjusted by switching the radial positions of the sliders 367.

Attaching and Detaching the Spool

To remove the spool 312 from the reel body 301, for example when backlash has caused the fishing line to become entangled with the spool 312, the first cover 306 is opened, revealing the opening 308a in the first side-plate 308.

To open the first side-cover 306, first, the nut 340 is turned counterclockwise, and the pivot shaft 334 is detached from the nut 340. When the pivot shaft 334 has been detached from the nut 340, the spring force of the coil spring 335 urges the pivot shaft 334 to the left in FIG. 13, together with the first side-cover 306. Then, the first side-cover 306 pivots around the pivot shaft 334 by its own weight, and the first side-cover 306 opens. FIGS. 10 and 14 illustrate the situation when the first side-cover is open. Opening the first side-cover 306 reveals the spool support member 313. In this situation, it is possible to insert one's fingers through the opening 316a and switch the position of the sliders 367 of the centrifugal braking mechanism 325 in the radial direction of the spool to adjust the braking force. That is to say, when the sliders 367 are located on the inside of the interlocking projections 370b, they cannot be brought into contact with the brake liner 368, so that the braking force is weakened.

When the first side-cover 306 is open, it is possible to hold the nub 316 with thumb and index finger and turn the spool support member 313 counterclockwise. This detaches the spool support member 313 from the first side-plate 308 and reveals the opening 308a. In this situation, it is possible to take the spool shaft 320 and pull it out to remove the spool 312.

To insert the spool 312, the spool support member 313 is attached to the first side-plate 308 and the first side-cover 306 is closed, after the spool 312 has been placed inside the reel body 301. To do so, the cover 333 is swung by hand into its closed orientation and then pressed toward the first side-plate 308. In this situation the nut 340 is turned clockwise and screwed onto the tip of the pivot shaft 334, thereby closing the first side-cover 306 on the first side-plate 308.

Operation and Function of the Reel During Actual Fishing

When casting, the clutch lever 317 is pushed down. This moves the clutch plate 355 counterclockwise in FIG. 20. This moves the clutch plate 355 on the inside of the guide portion 309g while the positioning pin 309e prevents it from drifting off. Moving the clutch plate 355 turns the clutch cam 356 counterclockwise, which shifts the clutch yoke 357 outward in FIG. 12 to the clutch-off position. As a result, the pinion gear 332, which is part of the clutch mechanism 321, shifts outward in the axial direction to the clutch-off state. In this clutch-off state, the spool 312 can rotate freely, and the fishing line unwinds with full momentum due to the weight of the rig when casting.

When the rig has hit the water, the handle 302 is rotated in the line take-up direction. This causes the ratchet gear 388 to rotate in the direction taking up the line (that is, clockwise in the drawings), and the ratchet pawl 389 pivots around the positioning pin 309d away from the ratchet gear 388 by the action of the control pieces 389a and abuts the guide shaft 354. As a result, when taking up line, the ratchet pawl 389 is out of contact with the ratchet gear 388, so that no clicking sound by contact between the two is generated when taking up line. Also, when the ratchet gear 388 rotates in the direction for taking up line, the ratchet teeth 388a abut against the tip of the return pawl 359 and push the return pawl 359 back. The return pawl 359 retreats beyond the dead point of the toggle spring 362, and is urged by the toggle spring 362 into a separated position. This movement turns the clutch cam 356 clockwise in FIG. 20 and the spring force of the coil spring 361 urges the clutch yoke 357 into the clutch-on position, putting the clutch mechanism 321 into the clutch-on state. Thus, the rotation of the handle 302 is transmitted to the spool 312, and the spool 312 rotates in the direction taking up line.

When the handle shaft 330 rotates in the direction taking up line, this rotation is relayed by the gear members 363a and 363b to the threaded shaft 346. As the threaded shaft 346 rotates, the fishing line guide portion 347 moves back and forth in the spool shaft direction, so that the fishing line is taken up uniformly by the spool 312.

Other Embodiments (a) In the above embodiments, examples were described, in which the dual-bearing reel is round, but the present invention can also be applied to a dual-bearing reel that is not round.

(b) In the embodiments described above, an opening is formed in the spool support member, but embodiments in which no opening is formed are also possible.

(c) In the embodiments described above, the spool support member is attached to the side-plate by screwing. However, to make it easily attachable and detachable, it is also possible to attach it to the side-plate with another locking structure such as a bayonet structure.

(d) In the embodiments described above, a nub is provided as a removal handle in the spool support member. However, depending on the locking structure of the spool support member, it is also possible to provide a removal handle on the side of the first side-plate. For example, it is possible to provide in the first side-plate a tongue member that is biased in an advance direction, to lock the spool support member with this tongue member in the opening, such that the spool support member can be detached by shifting the tongue member with the removal handle provided in the first side-plate.

(e) In the embodiments described above, the nub is oriented vertically (perpendicularly) when fitted into place, but as illustrated in the fifth embodiment, it can also be oriented back-and-forth (horizontally) when in place. This increases the strength when a force acts horizontally on the bearing portion. It is also possible to configure the nub to be cross-shaped.

(f) In the second embodiment, a protrusion is provided to stop the loosening and to prevent the improper setting of the spool support member. To stop the loosening more effectively, it is also possible to provide a protrusion made of an elastic material on the inner surface of the first cover, which can be brought into contact with the nub. In this case, the protrusion is always in contact with the nub when the first cover is closed, thus not designed to prevent the improper setting of the spool support member but continually to stop its loosening. Moreover, the threading process can be carried out without taking the rotational position of the nub 16 into consideration.

(g) In the embodiments described above, the spool support member can be operated separately from the first side-cover, but it is also possible to provide the spool support member in the first side-cover. In that case, the spool support member can be fixed to the first side-cover, or it can be provided rotatively.

(h) In the fifth embodiment, a relatively hard ABS resin was given as an example for the material of the sealing member. However, the material for the sealing member is not limited to ABS. For example, it is also possible to use an elastic element made of a synthetic resin such as silicone rubber, which is translucent, or a synthetic resin that is not translucent. Furthermore, when an emphasis is put on the reduction of weight, it is also possible to use other materials besides synthetic resins.

(i) In the fifth embodiment, the sealing member is fixed to the first side-cover by fastening it with a screw and by interlocking with the boss. However, there is no limitation to the method with which the sealing member is fixed, and it is possible to fix the sealing member to the first side-cover by any suitable means, such as by gluing. It is also possible to form it in one piece with the first side-cover by insert molding, for example.

(j) In the fifth embodiment, the sealing member covers all round holes at once, but it is also possible to seal the round holes individually or in groups.

In the present invention, the removal handle and the spool support member are covered by the first side-cover, so that the removal handle will not be operated by mistake when gripping the reel unit in a palming motion or the like, nor is an uncomfortable sensation caused by touching the removal handle. Furthermore, the removal handle is hidden behind the first side-cover and not directly visible from the outside, which increases the design possibilities for the first side-cover and makes it easier to attain a classic appearance.

In another aspect of the present invention, a distal side-cover can be opened and closed by operating one handle part that is accessible on the proximal side-cover (where the handle is mounted). This makes the opening and the closing easy. Moreover, since the handle part is provided on the side-cover where the handle is mounted, and which is not as easily touched by the palm when gripping the reel unit in a palming motion, the palm does not touch the handle part when gripping the wheel, even if the handle part sticks out.

In still another aspect of the present invention, a sealing member is provided, which covers a plurality of through-holes formed in the surface of a side-cover. Thus, the intrusion of water or dirt into the reel is suppressed, even though through-holes are formed in the side-cover to enhance the reel's appearance and to make it lighter.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A dual-bearing reel body on a proximal side of which a spool-cranking handle is disposed on a handle shaft and inside of which a spool is disposed on a spool shaft, the dual-bearing reel body comprising:

a frame having a proximal side-plate and, disposed at a spacing from the proximal side-plate, a distal side-plate provided with a circular first opening through which the spool can be passed;

a spool support member supporting one end of the spool shaft and removably fitted to the distal side-plate such that removing the spool support member exposes the first opening, wherein the spool support member and the distal side-plate constitute a spool support structure;

a removal handle provided on said spool support structure for removing the spool support member;

a detachable distal side-cover externally covering the distal side-plate wherein the first opening is formed, and at the same time covering the spool support member and the removal handle; and a proximal side-cover externally covering the proximal side-plate and supporting the handle shaft.

2. A dual-bearing reel body as set forth in claim 1, wherein at least one pair of the distal side-cover and side-plate as a pair and the proximal side-cover and side-plate as a pair is substantially circular in profile when viewed in the rotational shaft direction.

3. A dual-bearing reel body as set forth in claim 2, wherein the two side-covers and the frame are made of metal.

4. A dual-bearing reel body as set forth in claim 1, wherein:
    a female interlocking portion is provided in the first opening; and
    a male interlocking portion for coupling with the female interlocking portion by rotation is provided in the spool support member.

5. A dual-bearing reel body as set forth in claim 4, wherein the female interlocking portion is internal threads, and the male interlocking portion is external threads.

6. A dual-bearing reel body as set forth in claim 4, wherein the removal handle comprises a handling protrusion for a turning operation, provided in the outer surface of the spool support member.

7. A dual-bearing reel body as set forth in claim 6, wherein the spool support member is provided with a second opening between the handling protrusion and the male interlocking portion, through which the side of the spool is accessible.

8. A dual-bearing reel body as set forth in claim 6, wherein a face of the first side-cover that is in opposition to the distal side-plate is provided with a protrusion, against which the handling protrusion abuts if the spool support member has not been screwed in properly.

9. A dual-bearing reel body as set forth in claim 1, wherein the first side-cover is mounted on the distal side-plate, such that the first side-cover is axially movable and pivotal around a first axis that is parallel to the spool rotation shaft.

10. A dual-bearing reel body as set forth in claim 9, further comprising a first urging member urging the first side-cover away from the distal side-plate.

11. A dual-bearing reel body as set forth in claim 9, wherein the spool support member is mounted in the distal side-plate on the inner side of the first side-cover, to be pivotal around the first axis and axially movable.

12. A dual-bearing reel body as set forth in claim 11, further comprising a second urging member urging the spool support member away from the distal side-plate.

13. A dual-bearing reel body as set forth in claim 9, wherein:
    a pivot shaft is disposed in the distal side-plate along the first axis, to be therein pivotal and axially shiftable; and
    the first side-cover is fastened to the distal end of the pivot shaft.

14. A dual-bearing reel body as set forth in claim 13, further comprising a threaded member for screw-meshing onto the proximal end of the pivot shaft, to attach the threaded member rotatively and irremovably to the second side-cover.

15. A dual-bearing reel body as set forth in claim 13, further comprising a locking member for locking the proximal end of the pivot shaft, the locking member being mounted in the second side-cover and radially shiftable with respect to the pivot shaft.

16. A dual-bearing reel body as set forth in claim 1, wherein the first side-cover is mounted pivotally around an axis that is parallel to a second axis intersecting the spool shaft.

17. A dual-bearing reel body as set forth in claim 9, further comprising a means for retaining the first side-cover open when it has been pivoted open.

18. A dual-bearing reel body to be mounted on a fishing rod, a spool-cranking handle being disposed on a handle shaft on a proximal side of the dual-bearing reel body and a spool being disposed inside the dual-bearing reel body on a spool shaft, the dual-bearing reel body comprising:
    a frame including a pair of proximal and distal side-plates between which the spool is disposed and connection members for interconnecting the side-plates;
    a pair of proximal and distal side-covers for covering the outer sides of the two side-plates, wherein the spool-cranking handle is mounted on the proximal side-cover, and the distal side-cover can be opened and closed on the distal side-plate;
    a fishing rod mounting portion for mounting onto a fishing rod, the fishing rod mounting portion being disposed between the pair of side-plates; and
    an open/close mechanism for opening and closing the distal side-cover, the open/close mechanism including a handling part for opening and closing the distal side-cover, said handling part being accessible on the proximal side-cover.

19. A dual-bearing reel body as set forth in claim 18, wherein
    at least one pair of the distal side-cover and side-plate as a pair and the proximal side-cover and side-plate as a pair is substantially circular in profile when viewed from the rotation shaft direction.

20. A dual-bearing reel body as set forth in claim 19, wherein the two side-covers and the frame are made of metal.

21. A dual-bearing reel body as set forth in claim 18, wherein the distal side-cover is mounted on the distal side-plate, such that the distal side-cover is axially movable and pivotal around a first axis that is parallel to the spool rotation shaft.

22. A dual-bearing reel body as set forth in claim 21, further comprising a first urging member urging the distal side-cover away from the distal side-plate.

23. A dual-bearing reel body as set forth in claim 21, wherein:
    a pivot shaft is disposed in the distal side-plate along the first axis, to be therein pivotal and axially shiftable; and
    the first side-cover is fixed to the distal end of the pivot shaft.

24. A dual-bearing reel body as set forth in claim 23, wherein the handling part is a threaded member provided rotatively and irremovably in the proximal side-cover and for screw-meshing onto the proximal end of the pivot shaft.

25. A dual-bearing reel body as set forth in claim 23, wherein the handle part is an interlocking member arranged in the proximal side-cover to be radially shiftable with respect to the pivot shaft, therein for interlocking with the proximal end of the pivot shaft.

26. A dual-bearing reel body as set forth in claim 18, wherein the distal side-cover is mounted pivotally around an axis that is parallel to a second axis intersecting the spool rotation shaft.

27. A dual-bearing reel body as set forth in claim 21, further comprising a means for retaining the first side-cover open when it has been pivoted open.

28. A dual-bearing reel body to be mounted on a fishing rod, a spool-cranking handle being disposed on a handle shaft on a proximal side of the dual-bearing reel body and a spool being disposed inside the dual-bearing reel body on a spool shaft, the dual-bearing reel body comprising:
    a frame including a pair of proximal and distal side-plates between which the spool is disposed and connection members for connecting the side-plates;

a pair of proximal and distal side-covers covering the outer sides of the two side-plates, at least one of the pair of side-covers perforated by a plurality of through-holes;

a sealing member disposed on an inner surface of at least the one of the pair of side-covers, for covering the plurality of through-holes; and a fishing rod mounting portion for mounting onto the fishing rod, the fishing rod mounting portion being disposed between the pair of side-plates.

29. A dual-bearing reel body as set forth in claim 28, wherein:

the spool-cranking handle is mounted on the proximal side-cover; and the through-holes are formed only on the distal side-cover wherein the spool-cranking handle is not mounted.

30. A dual-bearing reel body as set forth in claim 28, wherein the sealing member is mounted on substantially the entire inner surface of at least the one of the pair of side-covers pierced by the plurality of through-holes.

31. A dual-bearing reel body as set forth in claim 30, wherein the sealing member comprises a fastening portion for fastening the sealing member to at least the one of the pair of side-covers.

32. A dual-bearing reel body as set forth in claim 31, wherein:

a circular opening through which the spool can be passed is formed in the distal side-plate;

the dual-bearing reel body further comprises a spool support member detachable by rotation on the distal side-plate to expose the opening, and rotatively supporting one end of the spool rotation shaft; and the fastening portion of the sealing member includes a protrusion protruding towards the spool support member for acting as a spool support member turn-stop.

33. A dual-bearing reel body as set forth in claim 31, wherein in a position separate from the fastening portion, the sealing member further comprises an interlocking portion for interlocking with the distal side-cover.

34. A dual-bearing reel body as set forth in claim 28, wherein the sealing member is made of a synthetic resin polymer.

35. A dual-bearing reel body as set forth in claim 34, wherein the sealing member is translucent.

* * * * *

UNITED STATES PATENT AND TRADEMARK OFFICE
CERTIFICATE OF CORRECTION

PATENT NO.    : 6,460,793 B1                                          Page 1 of 1
DATED         : October 8, 2002
INVENTOR(S)   : Hirayama et al.

It is certified that error appears in the above-identified patent and that said Letters Patent is hereby corrected as shown below:

<u>Title page,</u>
Item [*], Notice, "74 days" should read -- 116 days --.

Signed and Sealed this

Twenty-first Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,460,793 B1
DATED         : October 8, 2002
INVENTOR(S)   : Hirokazu Hirayama It is certified that error appears in the above-identified patent and that said Letters Patent is hereby corrected as shown below:

<u>Title page,</u>
Insert Item

-- [30]   Foreign Application Priority Data

Oct. 5, 1999    (JP)   Japan    11-284423
   Nov. 19, 1999   (JP)   Japan    11-330608
   Nov. 19, 1999   (JP)   Japan    11-330609 --.

Signed and Sealed this

Thirty-first Day of August, 2004

JON W. DUDAS
*Director of the United States Patent and Trademark Office*